United States Patent
Ji et al.

(10) Patent No.: US 11,901,113 B2
(45) Date of Patent: Feb. 13, 2024

(54) INVERSELY COUPLED INDUCTOR AND POWER SUPPLY MODULE

(71) Applicant: Delta Electronics (Shanghai) Co., Ltd., Shanghai (CN)

(72) Inventors: Pengkai Ji, Shanghai (CN); Jinping Zhou, Shanghai (CN); Shouyu Hong, Shanghai (CN); Jianhong Zeng, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 596 days.

(21) Appl. No.: 16/735,715

(22) Filed: Jan. 7, 2020

(65) Prior Publication Data
US 2020/0219647 A1     Jul. 9, 2020

(30) Foreign Application Priority Data

Jan. 7, 2019   (CN) .......................... 201910013070.3
Aug. 27, 2019  (CN) .......................... 201910796711.7

(51) Int. Cl.
*H01F 27/28*     (2006.01)
*H01F 27/30*     (2006.01)
(Continued)

(52) U.S. Cl.
CPC .............. *H01F 27/306* (2013.01); *G05F 1/30* (2013.01); *H01F 3/08* (2013.01); *H01F 3/14* (2013.01);
(Continued)

(58) Field of Classification Search
CPC . H01F 27/306; H01F 3/08; H01F 3/14; H01F 5/06; H01F 17/04; H01F 27/266;
(Continued)

(56) References Cited

U.S. PATENT DOCUMENTS

| 4,384,321 A | 5/1983 | Rippel |
| 5,111,278 A | 5/1992 | Eichelberger |

(Continued)

FOREIGN PATENT DOCUMENTS

| CN | 1637969 A | 7/2005 |
| CN | 1921035 A | 2/2007 |

(Continued)

OTHER PUBLICATIONS

Corresponding India office action dated Oct. 25, 2021.
(Continued)

*Primary Examiner* — Mang Tin Bik Lian
(74) *Attorney, Agent, or Firm* — CKC & Partners Co., LLC

(57) ABSTRACT

Provided are an inversely coupled inductor and a power module. The inversely coupled inductor includes a magnetic core, a first winding and a second winding, where a first passage is formed in the magnetic core; a part of the first winding and a part of the second winding pass through the first passage, and the first winding crosses with the second winding outside the first passage. The power supply module includes the above inversely coupled inductor, which is in turn stacked on, and electrically connected to, the packaged chip module. By arranging the two windings to cross with each other on the outside of the first passage of the magnetic core, the same type terminal (such as input pins or output pins) of the inversely coupled inductor can be located on the same side.

19 Claims, 24 Drawing Sheets

(51) Int. Cl.
- *H01F 27/26* (2006.01)
- *H01F 27/32* (2006.01)
- *H01F 17/04* (2006.01)
- *H01F 27/29* (2006.01)
- *H01F 3/08* (2006.01)
- *G05F 1/30* (2006.01)
- *H02M 3/158* (2006.01)
- *H01F 5/06* (2006.01)
- *H01F 3/14* (2006.01)

(52) U.S. Cl.
CPC .............. *H01F 5/06* (2013.01); *H01F 17/04* (2013.01); *H01F 27/266* (2013.01); *H01F 27/29* (2013.01); *H01F 27/324* (2013.01); *H02M 3/158* (2013.01); *H01F 2017/048* (2013.01)

(58) Field of Classification Search
CPC .. H01F 27/29; H01F 27/324; H01F 2017/048; H01F 27/255; H01F 27/303; H01F 27/28; H01F 27/2847; G05F 1/30; H02M 3/158; H02M 1/0064; H02M 1/009; H02M 3/1582; H02M 3/1584
See application file for complete search history.

(56) References Cited

U.S. PATENT DOCUMENTS

| | | | |
|---|---|---|---|
| 5,568,111 A * | 10/1996 | Metsler | H01F 17/04 336/83 |
| 5,939,966 A * | 8/1999 | Shin' Ei | H01F 41/061 336/200 |
| 6,362,986 B1 | 3/2002 | Schultz et al. | |
| 6,627,984 B2 | 9/2003 | Bruce et al. | |
| 6,806,580 B2 | 10/2004 | Joshi et al. | |
| 7,173,333 B2 | 2/2007 | Hata et al. | |
| 7,199,695 B1 | 4/2007 | Zhou | |
| 7,525,406 B1 * | 4/2009 | Cheng | H01F 17/043 336/83 |
| 7,898,379 B1 * | 3/2011 | Stratakos | H01F 3/00 336/200 |
| 8,736,040 B2 | 5/2014 | Hauenstein et al. | |
| 10,186,950 B2 | 1/2019 | Wolf et al. | |
| 10,438,736 B2 | 10/2019 | Zhou et al. | |
| 10,819,227 B2 | 10/2020 | Zhou et al. | |
| 11,605,495 B2 | 3/2023 | Xiong et al. | |
| 2001/0007287 A1 | 7/2001 | Hoche | |
| 2001/0030595 A1 | 10/2001 | Hamatani et al. | |
| 2004/0183645 A1 | 9/2004 | Takaya et al. | |
| 2005/0161785 A1 | 7/2005 | Kawashima et al. | |
| 2006/0232942 A1 | 10/2006 | Nakatsu et al. | |
| 2008/0067990 A1 | 3/2008 | Wei | |
| 2008/0180077 A1 | 7/2008 | Qiu et al. | |
| 2008/0265858 A1 | 10/2008 | Muratov | |
| 2008/0315982 A1 | 12/2008 | Wei et al. | |
| 2011/0127678 A1 | 6/2011 | Shim et al. | |
| 2011/0148560 A1 | 6/2011 | Ikriannikov | |
| 2011/0279212 A1 | 11/2011 | Ikriannikov et al. | |
| 2012/0008286 A1 | 1/2012 | Suzuki | |
| 2012/0014059 A1 | 1/2012 | Zeng et al. | |
| 2012/0049994 A1 | 3/2012 | Joo et al. | |
| 2012/0161128 A1 | 6/2012 | Macheiner et al. | |
| 2013/0049137 A1 | 2/2013 | Uno et al. | |
| 2013/0094269 A1 | 4/2013 | Maeda et al. | |
| 2014/0266552 A1 * | 9/2014 | Silva | H01F 27/306 29/606 |
| 2015/0055306 A1 | 2/2015 | Burns et al. | |
| 2015/0235753 A1 | 8/2015 | Chatani et al. | |
| 2015/0235754 A1 | 8/2015 | Ikriannikov | |
| 2016/0020013 A1 | 1/2016 | Berdy et al. | |
| 2016/0300658 A1 | 10/2016 | Wu et al. | |
| 2016/0300659 A1 | 10/2016 | Zhang et al. | |
| 2016/0307690 A1 | 10/2016 | Madsen et al. | |
| 2017/0064808 A1 | 3/2017 | Rizza et al. | |
| 2017/0178794 A1 | 6/2017 | Yan et al. | |
| 2017/0250025 A1 | 8/2017 | Wei et al. | |
| 2018/0061560 A1 | 3/2018 | Wukovits et al. | |
| 2018/0102349 A1 | 4/2018 | Cho | |
| 2018/0122562 A1 | 5/2018 | Ji et al. | |
| 2018/0182945 A1 | 6/2018 | Shimabukuro | |
| 2018/0204666 A1 | 7/2018 | Zhou et al. | |
| 2018/0204741 A1 | 7/2018 | Chew | |
| 2018/0323147 A1 | 11/2018 | Kirby | |
| 2018/0323702 A1 | 11/2018 | Zhou et al. | |
| 2018/0336986 A1 | 11/2018 | Xin et al. | |
| 2019/0052171 A1 | 2/2019 | Kitamoto | |
| 2019/0108939 A1 * | 4/2019 | Fujimoto | H01F 27/306 |
| 2019/0122814 A1 | 4/2019 | Hung | |
| 2019/0172629 A1 | 6/2019 | Zhou et al. | |
| 2019/0189334 A1 | 6/2019 | Miyashita et al. | |
| 2019/0214181 A1 | 7/2019 | Wang et al. | |
| 2019/0252114 A1 | 8/2019 | Lu et al. | |
| 2019/0385775 A1 | 12/2019 | Roth et al. | |
| 2020/0219647 A1 | 7/2020 | Ji et al. | |
| 2020/0219648 A1 | 7/2020 | Ji et al. | |
| 2021/0210472 A1 | 7/2021 | Ji et al. | |
| 2021/0350969 A1 | 11/2021 | Ji et al. | |
| 2022/0158558 A1 | 5/2022 | Ikriannikov et al. | |
| 2022/0158562 A1 | 5/2022 | Yang et al. | |
| 2022/0351898 A1 | 11/2022 | Wang et al. | |
| 2023/0085737 A1 | 3/2023 | Yang et al. | |

FOREIGN PATENT DOCUMENTS

| | | |
|---|---|---|
| CN | 101038880 A | 9/2007 |
| CN | 101197205 A | 6/2008 |
| CN | 101330075 A | 12/2008 |
| CN | 101378049 A | 3/2009 |
| CN | 101414602 A | 4/2009 |
| CN | 101483381 A | 7/2009 |
| CN | 101615612 A | 12/2009 |
| CN | 201532825 U | 7/2010 |
| CN | 102314998 A | 1/2012 |
| CN | 102369790 A | 3/2012 |
| CN | 103081325 A | 5/2013 |
| CN | 103298258 A | 9/2013 |
| CN | 103681535 A | 3/2014 |
| CN | 103730434 A | 4/2014 |
| CN | 103887292 A | 6/2014 |
| CN | 104051363 A | 9/2014 |
| CN | 105575943 A | 5/2016 |
| CN | 105679738 A | 6/2016 |
| CN | 105810406 A | 7/2016 |
| CN | 105914185 A | 8/2016 |
| CN | 205752461 U | 11/2016 |
| CN | 107006118 A | 8/2017 |
| CN | 107086212 A | 8/2017 |
| CN | 107452481 A | 12/2017 |
| CN | 107919350 A | 4/2018 |
| CN | 207274460 U | 4/2018 |
| CN | 108231607 A | 6/2018 |
| CN | 108492965 A | 9/2018 |
| CN | 108648902 A | 10/2018 |
| CN | 108962773 A | 12/2018 |
| EP | 1168384 A1 | 1/2002 |
| EP | 1835604 A1 | 9/2007 |
| EP | 2482312 A2 | 8/2012 |
| JP | H11340085 A | 12/1999 |
| JP | 2007171159 A | 7/2007 |
| JP | 2009225612 A | 10/2009 |
| JP | 2012060796 A | 3/2012 |
| JP | 2012152104 A | 8/2012 |
| TW | 200402812 A | 2/2004 |
| TW | 201537722 A | 10/2015 |
| TW | 201837934 A | 10/2018 |
| WO | 2008139393 A1 | 11/2008 |
| WO | 2018012059 A1 | 1/2018 |
| WO | 2018043318 A1 | 3/2018 |

(56) References Cited

FOREIGN PATENT DOCUMENTS

WO     WO-2018190075 A1 * 10/2018   ............ H01F 17/06
WO         2021211682 A1    10/2021

OTHER PUBLICATIONS

The Office Action of U.S. Appl. No. 16/735,716 dated Sep. 10, 2021.
Machine translation of CN101378049.
Corresponding China office action dated Jun. 3, 2021.
Corresponding China office action dated May 31, 2021.
Corresponding U.S. office action dated Mar. 19, 2021.
Corresponding China office action dated Mar. 17, 2022 with its translation.
Corresponding China office action dated Mar. 21, 2022 with its translation.
Corresponding China NOA dated Jan. 20, 2022 with its translation.
Corresponding India office action dated Aug. 31, 2021.
Corresponding China office action dated May 24, 2021.
Corresponding India office action dated Apr. 7, 2021.
Corresponding China office action dated Nov. 3, 2022.
Corresponding China Notice of Allowance dated Nov. 14, 2022.
Corresponding U.S. office action dated Sep. 13, 2022.
Corresponding China office action dated Jul. 1, 2023.
Corresponding U.S. office action dated Jul. 14, 2023.
Corresponding U.S. office action dated Sep. 14, 2023.
Hearing Notice in Reference of India Application No. 201724037596 dispatched on Oct. 12, 2023.

* cited by examiner

Buck circuit

Boost Circuit

Buck/Boost Circuit

INVERSELY COUPLED INDUCTOR AND POWER SUPPLY MODULE

CROSS-REFERENCE TO RELATED APPLICATION

This application claims priority to Chinese Patent Application No. 201910013070.3, filed on Jan. 7, 2019, and Chinese Patent Application No. 201910796711.7, filed on Aug. 27, 2019. All of the aforementioned patent applications are hereby incorporated by reference in their entireties.

TECHNICAL FIELD

The present disclosure relates to an inversely coupled inductor and a power module, and belongs to the technical field of power electronics.

BACKGROUND

The inductor is a common electronic element in an integrated circuit that converts electrical energy into magnetic energy for storage. The inversely coupled inductor can realize separation of dynamic inductance from static inductance in that the same inductor can achieve smaller inductance when in a dynamic operation to improve the response speed as well as increased inductance when in a static operation to achieve a smaller ripple current, featuring both dynamic responsiveness and small static ripples. In addition, the size can be reduced by the magnetic integration and the cancellation effect from the flux reversal. In the layout of the existing inversely coupled inductor, it is inevitably required that same type terminals (such as input terminals or output terminals) of inversely coupled inductors are disposed on different sides of the inductors in order to reverse two-phase electric currents which are provided in parallel in the passage formed by the magnetic core to achieve the reversal and the cancellation effect of the magnetic flux in the magnetic core. This leads to different path lengths after the two-phase circuits are connected to the main board, and the impedance of the two phases will also be different, which is not conducive to current equalization.

SUMMARY

The present disclosure provides an inversely coupled inductor and a power supply module to address the above or other potential problems of the prior art.

It is an objective of the present disclosure to provide an inversely coupled inductor including: a magnetic core, a first winding and a second winding, where a first passage is formed in the magnetic core; a part of the first winding and a part of the second winding pass through the first passage, and the first winding crosses with the second winding outside the first passage.

The inversely coupled inductor as described above, where the magnetic core includes two side legs and two pillars which are oppositely arranged, respectively; and the two pillars are arranged between, and perpendicular to, the two side legs, and the first passage is defined by the side legs and the pillars.

The inversely coupled inductor as described above, where the first winding includes a first section and a second section, which are oppositely arranged, and a third section, which is positioned between, and electrically connected to, the first section and the second section; the second winding includes a fourth section and a fifth section, which are oppositely arranged, and a sixth section, which is positioned between, and electrically connected to, the fourth section and the fifth section; the first section and the fourth section penetrate the first passage; and the third section crosses with the sixth section outside the first passage.

The inversely coupled inductor as described above, where an electric current flows through the first section of the first winding in a direction opposite to an electric current flowing through the fourth section of the second winding.

The inversely coupled inductor as described above, where a second passage is further formed in the magnetic core along a first direction, where the second passage is located on a right side of, and is parallel with, the first passage; the second section and the fifth section penetrate the second passage; and the third section crosses with the sixth section outside the first passage and the second passage.

The inversely coupled inductor as described above, where an electric current flows through the second section of the first winding in a direction opposite to an electric current flowing through the fifth section of the second winding.

The inversely coupled inductor as described above, where the magnetic core includes two side legs and at least three pillars, where the first passage is a space formed by the two side legs and two adjacent ones of the pillars; and the second passage is a space formed by the two side legs and another two adjacent ones of the pillars.

The inversely coupled inductor as described above, where a decoupling leg is formed on at least one of the pillars and extends towards another adjacent one of the pillars, the decoupling leg being perpendicular to the pillar while forming, together with the adjacent pillar or a decoupling leg on the adjacent pillar, into an air gap operative to adjust a inversely coupling coefficient.

The inversely coupled inductor as described above, where the first section, the second section, and the third section are integrally formed into one piece, and/or the fourth section, the fifth section and the sixth section are integrally formed into one piece.

The inversely coupled inductor as described above, where the third section and the sixth section are plates, and the sixth section is located above the third section; the sixth section is formed with a first bump electrically connected to the fourth section and a second bump electrically connected to the fifth section, or, the fourth section includes a first bump and the fifth section includes a second bump; and the third section is formed with a first escape groove for the first bump to pass through and a second escape groove for the second bump to pass through.

The inversely coupled inductor as described above, where the sixth section is a plate, the sixth section is provided with a through hole, the third section is provided in the through hole, a direction of an electric current flowing through the sixth section intersects with a direction of an electric current flowing through the third section.

The inversely coupled inductor as described above, where the third section and the sixth section are mutually insulated, forming a unibody structure.

The inversely coupled inductor as described above, where the first section and the second section of the first winding and the fourth section and the fifth section of the second winding are injection-molded with the magnetic core into a unibody structure.

The inversely coupled inductor as described above, where the inversely coupling coefficient is adjusted by controlling a width of a gap between the first section and the fourth section, or by controlling a width of a gap between the second section and the fifth section.

The inversely coupled inductor as described above, where a packing for adjusting the inversely coupling coefficient is packed between the first section and the fourth section, or between the second section and the fifth section.

The inversely coupled inductor as described above, further including a plurality of pads for input/output currents, and the plurality of pads are provided on one side of the first passage.

The inversely coupled inductor as described above, where the magnetic core includes two side legs and a plurality of pillars, and the first winding crosses with the second winding on one of the pillars.

The inversely coupled inductor as described above, where the first winding crosses with the second winding on one side or both sides of the first passage.

The inversely coupled inductor as described above, where the first passage includes a first end face of the passage and a second end face of the passage, which are oppositely arranged; the third section of the first winding and the sixth section of the second winding are provided on the first end face of the passage and the second end face of the passage, respectively, and a projection of the sixth section of the second winding on the first end face of the passage crosses with the third section of the first winding.

The inversely coupled inductor as described above, where the first winding and/or the second winding are primarily made from a material having composite electric conductivity and/or strength.

Another objective of the present disclosure is to provide a power supply module, including: a packaged chip module and an inversely coupled inductor as described above, where the inversely coupled inductor is stacked on, and electrically connected to, the packaged chip module.

By arranging the two windings to cross with each other on the outside of the first passage of the magnetic core, dotted terminals for input and output pins of the inversely coupled inductor can be located on the same side, which is more convenient to use and facilitates current equalization.

Advantages of additional aspects of the present disclosure will be set forth in part in the description which follows, and some of the advantages will become apparent from the following descriptions, or be acquired in practicing the present disclosure.

BRIEF DESCRIPTION OF DRAWINGS

Referring to the following descriptions about the attached drawings, the above and other objectives, features and advantages of the embodiments of the present disclosure will become more comprehensible. In the drawings, various embodiments of the present disclosure will be described illustratively and non-restrictively, in which.

DETAILED DESCRIPTION OF EMBODIMENTS

Figure 1:
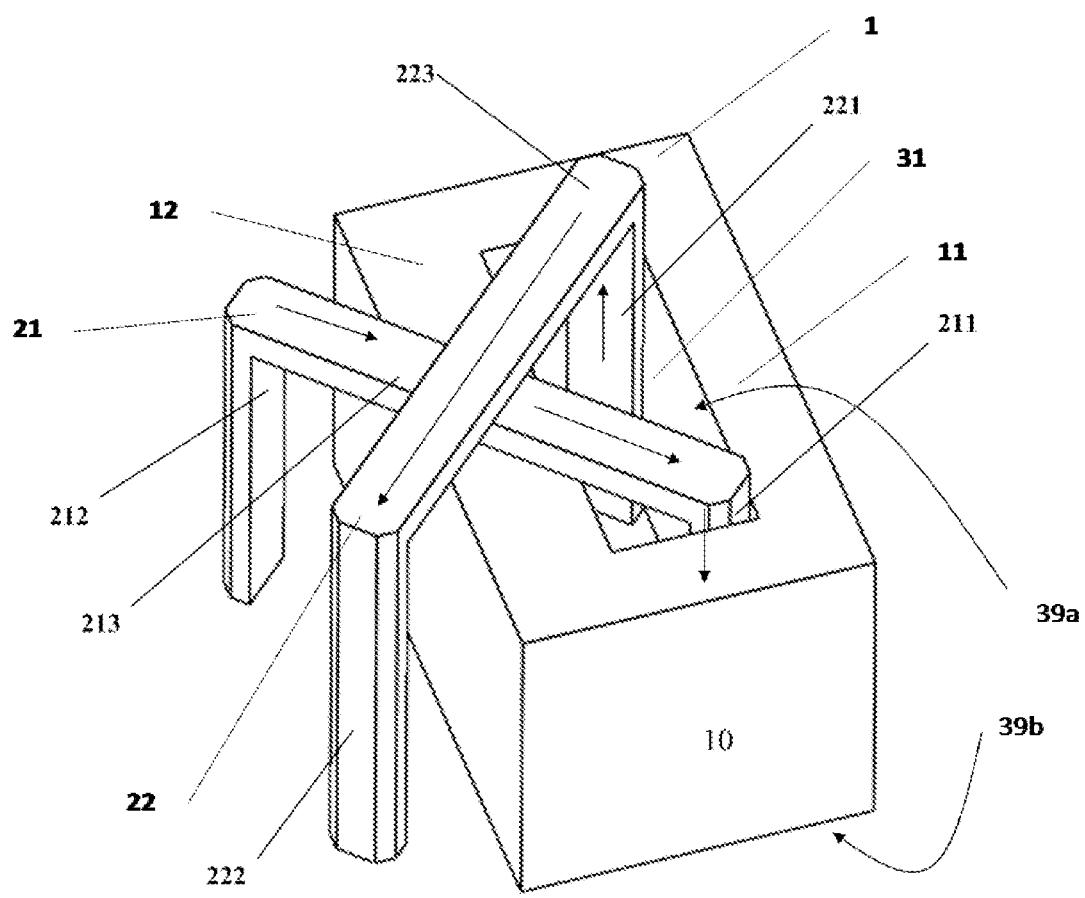
FIG. 1 is a schematic structural view of an inversely coupled inductor according to an embodiment of the present disclosure.

The embodiments of the present disclosure will be described in detail below, and examples of the embodiments are illustrated in the drawings, where the same or similar reference numerals throughout the specification are used to represent the same or similar elements, or elements having the same or similar functions. The embodiments described below with reference to the drawings are intended to be illustrative of the present disclosure, rather than to be construed as limiting.

In the description of the present disclosure, it is to be understood that the terms "upper", "lower", "front", "back", "left", "right", "vertical", "horizontal", "top", "bottom", "inside", "outside" and/or the like indicate orientations or positional relationships based on the orientations or positional relationships shown in the drawings for the mere purpose of facilitating and simplifying the description of the present disclosure, rather than indicating or implying that the device or element has to have a particular orientation or be configured and/or operated in a particular orientation, and hence may not be construed as limiting the present disclosure.

In addition, the terms "first" and "second" are used for descriptive purposes only and are not to be construed as indicating or implying a relative importance or implicitly indicating the number of technical features being indicated. Thus, features qualified by "first" and "second" may include at least one of the features, either explicitly or implicitly. In the description of the present disclosure, "a plurality" means at least two, such as two, three, etc., unless specifically defined otherwise.

Unless explicitly stated and defined otherwise, in the present disclosure, the terms "installed", "coupled", "connected", "fixed" and the like shall be understood broadly, e.g., they may indicate a fixed connection, a detachable connection, a unibody, a direct connection, an indirect connection via an intermediate medium, a communication within two elements or the interaction between two elements, unless explicitly defined otherwise. For persons of ordinary skill in the art, the specific meanings of the above terms in the present disclosure can be understood on a case-by-case basis.

In the description of the present specification, the description with reference to the terms "an embodiment", "some embodiments", "example", "specific example", "some examples" or the like means a specific feature, structure, material or characteristic described in connection with the embodiment or example is included in at least one embodiment or example of the present disclosure. In the present specification, the schematic representation of the above terms is not necessarily directed to the same embodiment or example. Furthermore, the specific feature, structure, material or characteristic described may be combined in a suitable manner in any one or more embodiments or examples. In addition, various embodiments or examples or features thereof described in the specification may be combined by persons skilled in the art if no conflict is thus created.

FIG. 1 is a schematic structural view of an inversely coupled inductor. As shown in FIG. 1, the inversely coupled inductor provided in this example is one in which same type terminals are located on the same side of the inversely coupled inductor, and includes a magnetic core 1, a first winding 21 and a second winding 22. In this embodiment, the same type terminals can all be input terminals or can all be output terminals. In other embodiment, one terminal of the same type terminals may be a dotted terminal while the other terminal may be a non-dotted terminal.

The magnetic core 1 includes two side legs 10 disposed opposite to each other, and pillars 11 and 12 that are disposed between, and perpendicular to, the two side legs 10. Both ends of the side legs 10 are joined to both ends of the pillars 11 and 12 to form a complete magnetic loop, that is, the side legs 10 and the pillars 11 and 12 define a first passage 31. In some examples, a "U" shaped magnetic core leg may be used instead of the side legs 10 and the pillars 11 and 12. When the "U" shaped magnetic core leg is used, only two magnetic legs engaged together are needed to form the magnetic core 1 having the first passage 31. The first passage 31 has two opposite end faces, namely a first end face 39a of the passage and a second end face 39b of the passage.

A portion of the first winding 21 and a portion of the second winding 22 both penetrate the first passage 31, and another portion of the first winding 21 and another portion of the second winding 22 cross with each other outside the first passage 31. Taking FIG. 1 as an example, the first winding 21 and the second winding 22 are both wound on the pillar 12 on the left, and the first winding 21 and the second winding 22, which are mutually insulated, cross with each other on the side of the first end face 39a of the passage outside the first passage 31.

Figure 2:
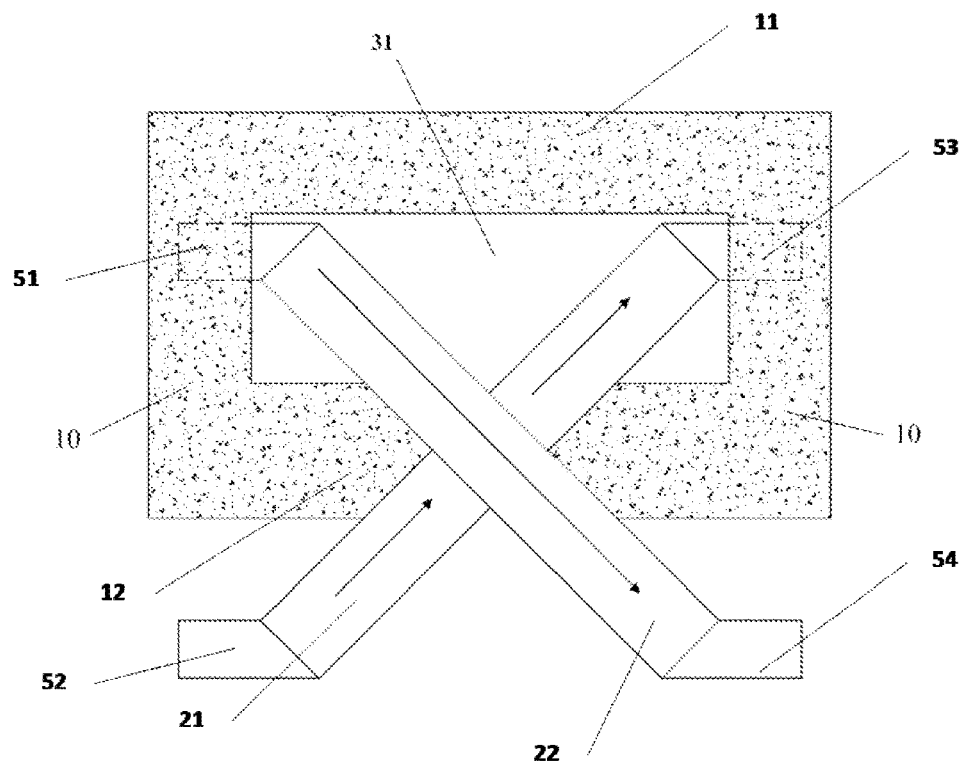
FIG. 2 is a top view of FIG. 1.

FIG. 2 is a top view of FIG. 1, illustrating the arrangement of the terminals (or pins, pads) at the same time. The first winding 21 and the second winding 22 cross with each other on the side of the first end face 39a of the passage, and on the opposite side, i.e., the side of the second end face 39b of the passage, pads 51 to 54 are provided as input and output pins of the inversely coupled inductor. Specifically, pads 51 and 52 are provided as input pins on the left side in FIG. 2, and pads 53 and 54 are provided as output pins on the right side in FIG. 2. The first winding 21 is electrically connected on one end to the pad 52, and on the other end to the pad 53. The second winding 22 is electrically connected on one end to the pad 51, and on the other end to the pad 54. As used herein, the terms "pad" and "pin" both refer to terminals via which the unit is electrically connected to the outside. In the following, for ease of use, "pad" and "pin" will be used interchangeably, and will be both labeled with the same reference numerals.

Still referring to FIGS. 1 and 2, in this example, the first winding 21 includes a first section 211, a second section 212, and a third section 213 that is located between, and serves to join, the first section 211 and the second section 212. The second winding 22 includes: a fourth section 221, a fifth section 222, and a sixth section 223 that is located between, and serves to join, the fourth section 221 and the fifth section 222. The first section 211 of the first winding 21 and the fourth section 221 of the second winding penetrate the first passage 31 of the magnetic core 1; the third section 213 of the first winding 21 and the sixth section 223 of the second winding 22 cross with each other on the side of the first end face 39a outside the first passage 31.

The arrows in the figures indicate the directions in which the electric current flows through the first winding 21 and the second winding 22. The electric current flows downwards through the portion of the first winding 21 located within the first passage 31 (i.e., the first section 211), and the electric current flows upwards through the portion of the second winding 22 located within the first passage 31 (i.e., the fourth section 221). That is, in the inversely coupled inductor provided in this embodiment, the electric currents flow in opposite directions through the portions of the first winding 21 and the second winding 22 that penetrate the first passage.

By arranging the current flow direction as the above, the magnetic fluxes induced in the magnetic core 1 by the first winding 21 and the second winding 22 are in opposite directions, forming an inversely coupled inductor. At the same time, the input pin of the first winding 21 (i.e., the pad 52) and the input pin of the second winding 22 (i.e., the pad 51) may both be located on the left side in FIG. 2, while the output pin of the first winding 21 (i.e., pad 53) and the output pin of the second winding 22 (i.e., pad 54) are both located on the right side in FIG. 2. In other words, the inductor provided in the present embodiment is inversely coupled, and by having the first winding 21 and the second winding 22 cross with each other outside the first passage 31, the same type terminals (such as all input terminals or all output terminals) can be located on the same side of the inductor.

It not only improves the symmetry of the two-phase circuit with the inversely coupled inductor, but also offers more convenience in applications.

It should be understood that this embodiment does not limit the electric current to flow in the above manner. Rather, this embodiment merely requires that portions of the two windings pass through a passage formed by the magnetic core, and that an intersection is created outside the passage for portions of the two windings other than those penetrating the passage of the magnetic core. Any other structural features may be selected or rearranged, either individually or in combination, as long as no contradiction is created.

Figure 3:
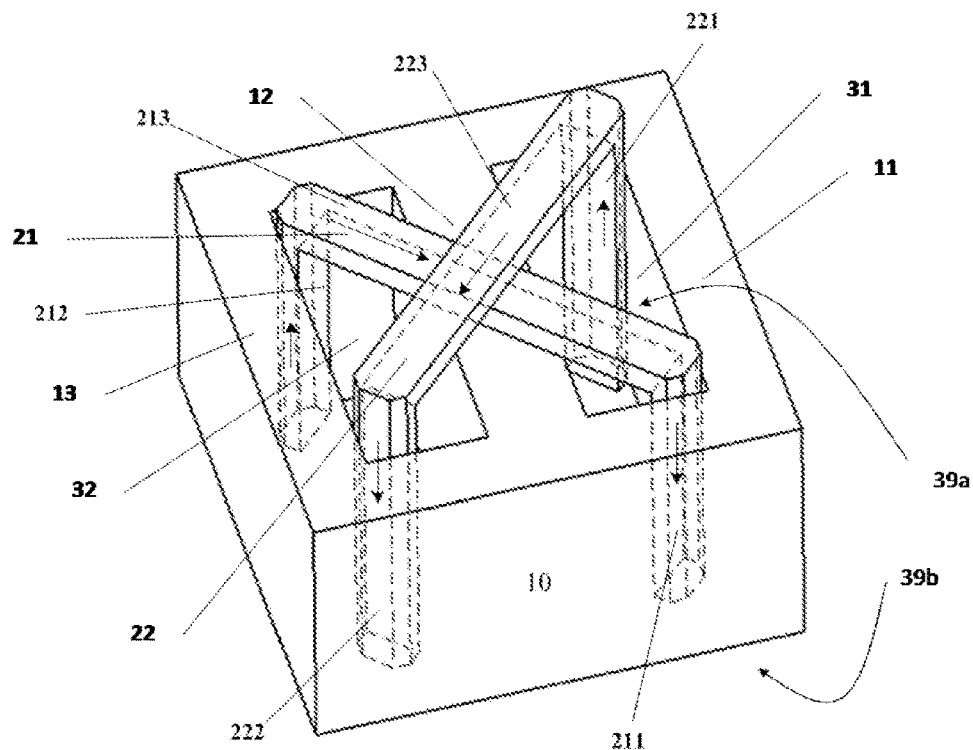
FIG. 3 is a schematic structural view of another inversely coupled inductor according to an embodiment of the present disclosure.
Figure 4:
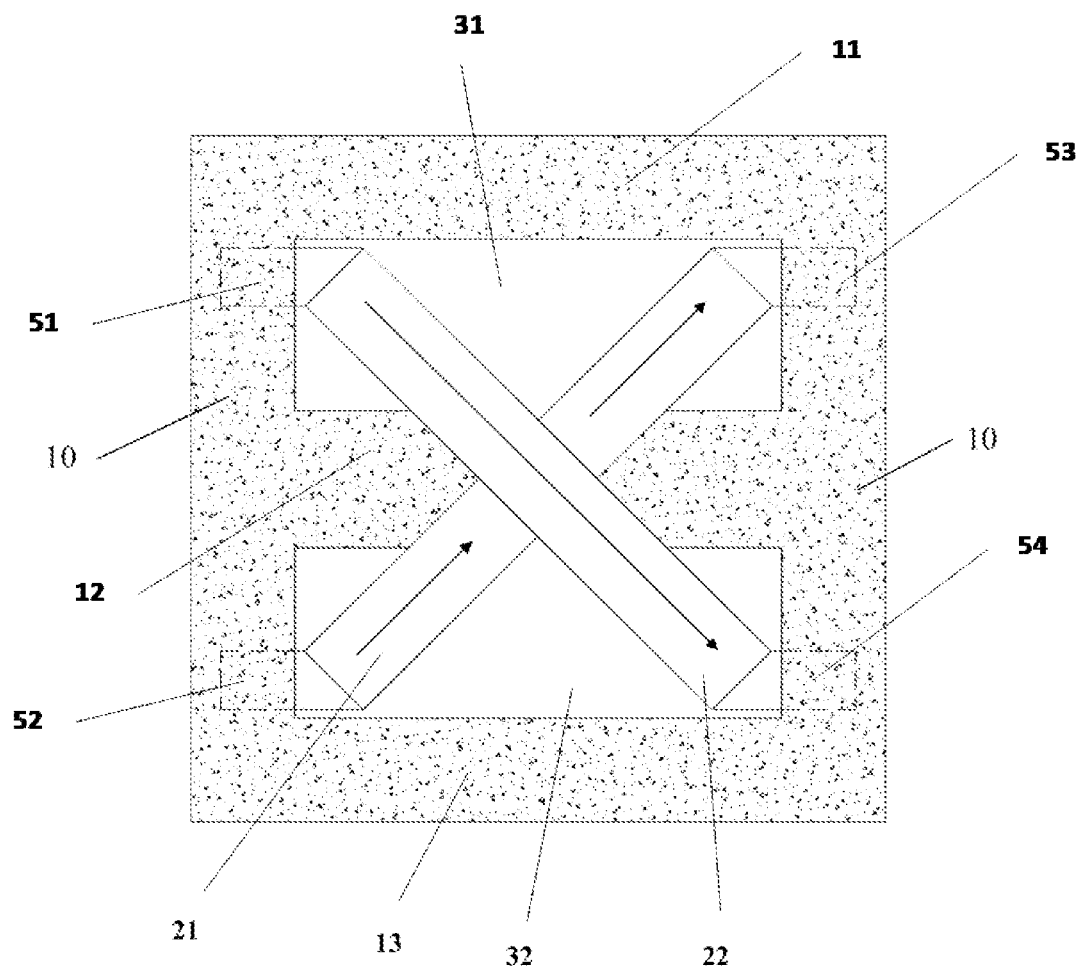
FIG. 4 is a top view of FIG. 3.

FIG. 3 is a schematic structural view of another inversely coupled inductor, and FIG. 4 is a top view of FIG. 3. As shown in FIGS. 3 and 4, the inversely coupled inductor of this example is different from that of FIGS. 1 and 2 in that the magnetic core 1 includes three pillars, i.e., pillars 11 to 13, where two side legs 10 and the pillars 11 and 12 form the first passage 31, and the two side legs 10 and the pillars 12 and 13 form a second passage 32. That is, the magnetic core 1 of FIGS. 3 and 4 forms an "8" shaped magnetic loop. Of course, in some examples, it is also possible to arrange more pillars 12 between the two side legs 10, so that more passages may be formed by the side legs 10 and the pillars 12. In this example, as compared against FIGS. 1 and 2, the second section 212 of the first winding 21 and the fifth section 222 of the second winding 22 also penetrate the second passage 32 of the magnetic core 1.

In this example, the electric currents flow in opposite directions not only for the first section 211 of the first winding 21 and the fourth section 221 of the second winding 22, but also for the second section 212 of the first winding 21 and the fifth section 222 of the second winding 22.

Through the above arrangement, the first winding 21 and the second winding 22 are both wound around the pillar 12, and the magnetic flux generated on the pillar 12 is simultaneously shunted to the side legs 11 and 13, which is advantageous for improving the symmetry and uniformity of the magnetic loop, and reducing magnetic loss. The first windings 21 and 22 cross with, and are insulated from, each other outside the passages 31 and 32, i.e., on the side of the first end face 39a of the passage. Referring to FIG. 4, pads 51 to 54 are formed on the other side of the passages 31 and 32 (i.e., on the side of the second end face 39b of the passage).

In FIGS. 3 and 4, the arrows in the figures indicate the directions in which the electric current flows through the first winding 21 and the second winding 22. Similar to FIGS. 1 and 2, the electric currents flow in opposite directions through the portions of the first winding 21 and the second winding 22 that are in the first passage 31 (i.e., the electric currents flow in opposite directions through the first section 211 of the first winding 21 and the fourth section 221 of the second winding 22). Similarly, the electric currents also flow in opposite directions through the portions of the first winding 21 and the second winding 22 that are in the second passage 32 (i.e., the electric currents flow in opposite directions through the second section 212 of the first winding 21 and the fifth section 222 of the second winding 22). Thus, the magnetic fluxes induced in the pillar 12 by the two windings are in opposite directions, forming an inversely coupled inductor. Compared against the embodiment shown in FIGS. 1 and 2, the inductor shown in FIGS. 3 and 4 is more conducive to achieving an inversely coupled inductor with more inductance or saturation current when the size is the same. Put in other words, it is more advantageous in reducing the size of the inductor. Since the first winding 21 and the second winding 22 are arranged to cross with each other outside the first passage 31 and the second passage 32 of the magnetic core 1, the same type terminals (such as all input terminals or all output terminals, e.g., the input terminals 52 and 51) can be located on the same side of the inductor. For example, pads 51 and 52 are input pins that are arranged on the left side of the inductor, while pads 53 and 54 are output pins that are arranged on the right side of the inductor.

The above arrangement is advantageous in improving the symmetry of the two-phase circuit, and is easy to use. At the same time, since the two windings 21 and 22 cross with each other outside of the passages 31 and 32 formed in the magnetic core 1 and the pins of the inductor are all disposed on the other sides of the passages, it becomes possible, when fabricating the inductor, to pre-fabricate the magnetic core 1 and windings 21 and 22 separately, and then insert the windings 21 and 22 into the passages 31 and 32 of the magnetic core 1, and form the pads 51 to 54 as input and output pins on the other sides of the passages 31 and 32, arriving at a more simplified and efficient fabricating process, and also being conducive to modular product design. Since the two windings 21 and 22 cross with each other outside of the passages 31 and 32 formed in the magnetic core 1, the mutual insulation treatment at the crossed portions of the windings is also made easier. In addition, the input and output pins (i.e., pads 51 to 54) of the windings 21 and 22 are in a plane that extends along a vertical direction. This is advantageous in conducting heat in the vertical direction, hence may serve as a mounting plane for a heatsink on the upper surface of the inductor (i.e., the plane where the windings 21 and 22 intersect as in FIGS. 3 and 4) to facilitate conduction and dissipation of heat in the vertical direction.

Furthermore, although the windings 21 and 22 are shown as a unibody structure in FIGS. 3 and 4, individual sections of the windings 21 and 22 may also be discrete structures. Additionally, in some examples, it is possible for one of the windings 21 and 22 to be a discrete structure while the other to be a unibody structure.

Figure 5:
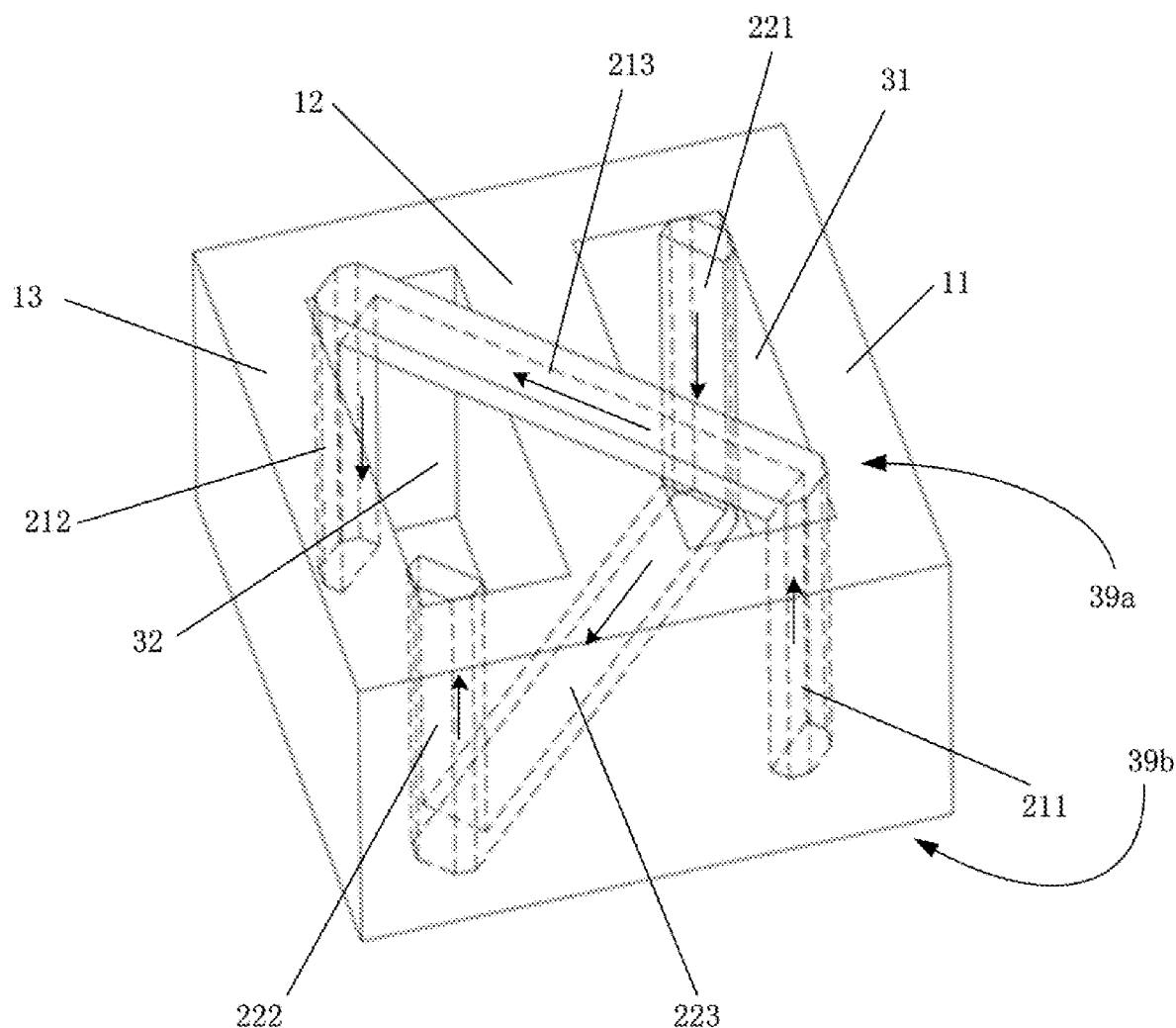
FIG. 5 is a schematic structural view of another inversely coupled inductor according to an embodiment of the present disclosure.
Figure 6:
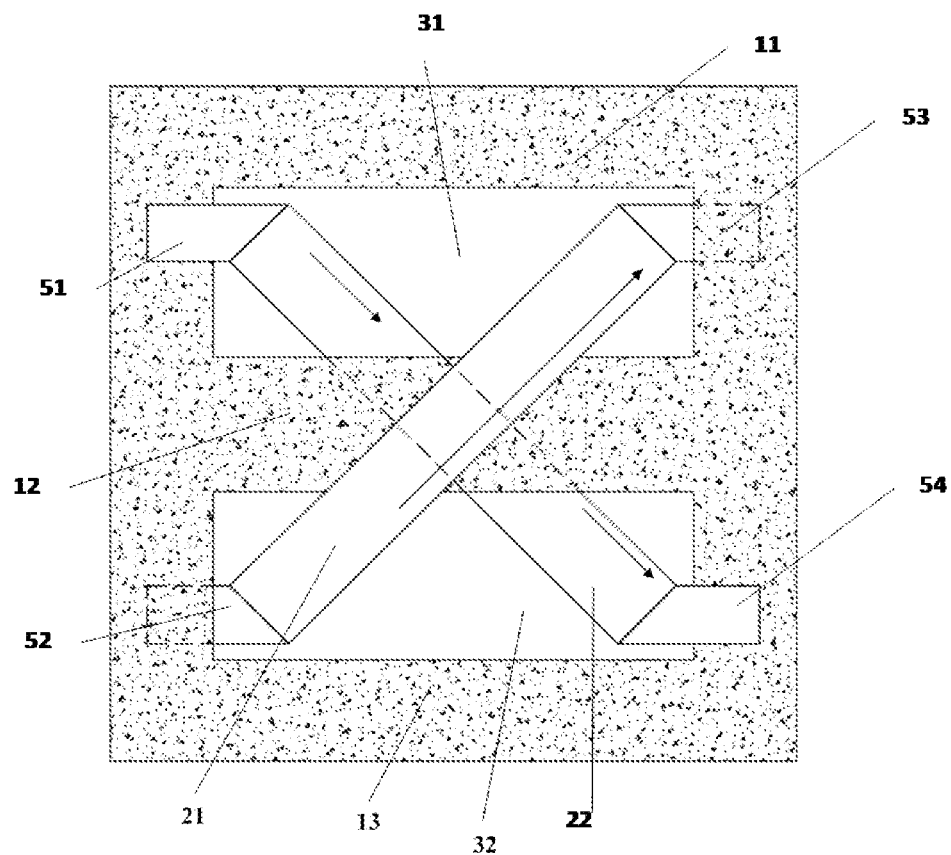
FIG. 6 is a top view of FIG. 5.

FIG. 5 is a schematic structural view of another inversely coupled inductor, and FIG. 6 is a top view of FIG. 5. As shown in FIGS. 5 and 6, the inversely coupled inductor of this example is different from that of FIGS. 3 and 4 in that the first winding 21 is inserted into the passages 31 and 32 of the magnetic core 1 from the side of the first end face 39a of the passage, and the second winding 22 is inserted into the passages 31 and 32 of the magnetic core 1 from the side of the second end face 39b of the passage. The third section 213 of the first winding 21 and the sixth section 223 of the second winding 22 are disposed at the first end face 39a of the passage and the second end 39b of the passage, respectively, while the projection of the sixth section 223 of the second winding 22 on the first end face 39a of the passage crosses with the third section 213 of the first winding 21.

Still referring to FIG. 6, in this example, the pads 51 and 54 are located on the same side of the magnetic core 1 as the first winding 21, that is, the pad 51 and the pad 54 are also located on the side of the first end face 39a of the passage. The pads 52 and 53 are located on the same side of the magnetic core 1 as the second winding 22, that is, the pads 52 and 53 are also located on the side of the second end face 39b of the passage. Although the first winding 21 and the second winding 22 are located on different end faces, the first winding 21 and the second winding 22 still achieve a crossing outside the passages 31 and 32. The pads 51 and 52, which are provided as input terminals, are both on the left side in FIG. 6, albeit on different end faces of the magnetic core 1. Similarly, the pads 53 and 54, which are provided as output terminals, are both on the right side in FIG. 6, albeit on different end faces of the magnetic core 1. Moreover, with the above arrangement, the first winding 21 and the second winding 22 can be insulated from each other without special treatment, so that the first winding 21 and the second winding 22 can be identical parts, thereby reducing the number of parts types that need to be separately manufactured, which in turn reduces costs.

Figure 7:
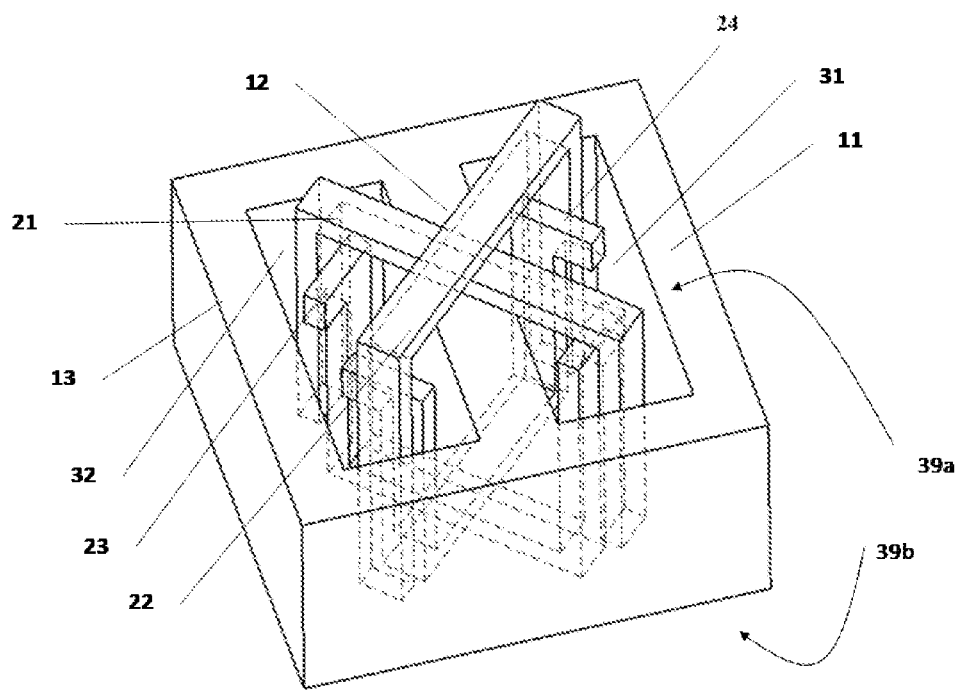
FIG. 7 is a schematic structural view of another inversely coupled inductor according to an embodiment of the present disclosure.
Figure 8:
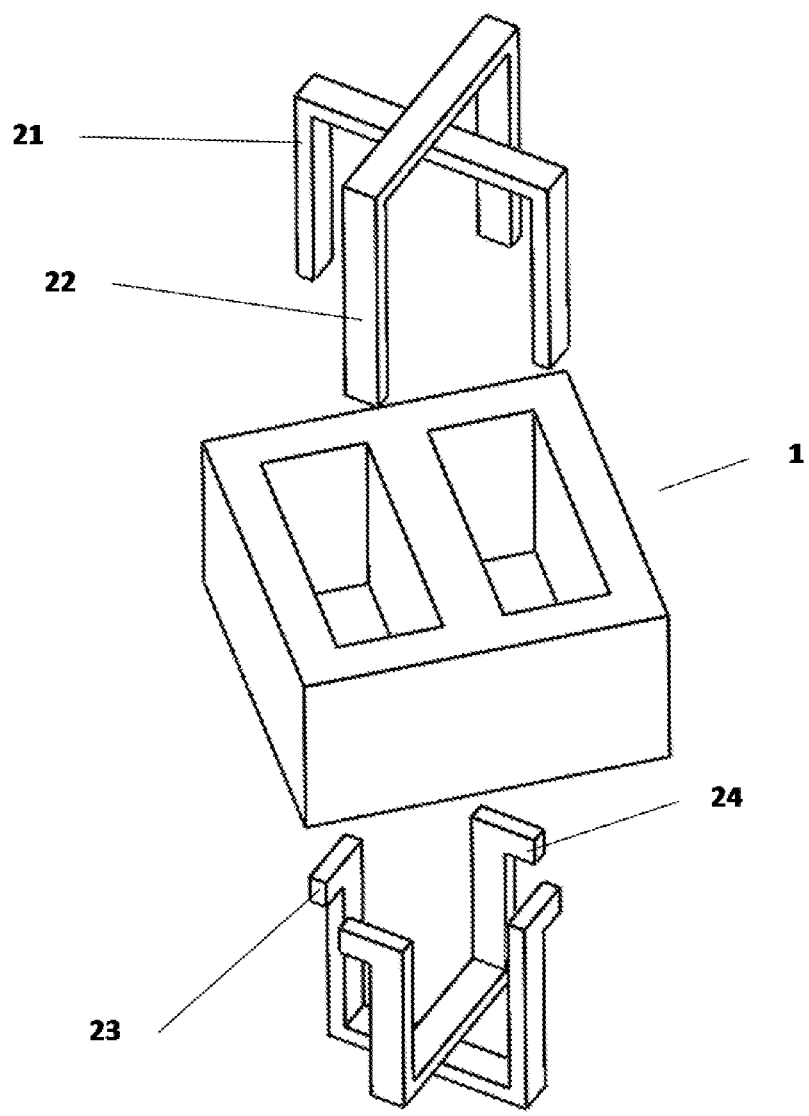
FIG. 8 is an exploded view of FIG. 7.

FIG. 7 is a schematic structural view of another inversely coupled inductor, and FIG. 8 is an exploded view of FIG. 7. As shown in FIGS. 7 and 8, the inversely coupled inductor of this example differs from that of FIGS. 3 and 4 in that it further includes a third winding 23 and a fourth winding 24. The first winding 21 and the second winding 22 are inserted into the passages 31 and 32 of the magnetic core 1 from the side of the first end face 39a of the passage, and the third winding 23 and the fourth winding 24 are inserted into the passages 31 and 32 of the magnetic core 1 from the side of the second end face 39b of the passage. Portions of the first winding 21 and the second winding 22 cross with each other outside the passages 31 and 32 in a manner similar to the previous embodiments. Meanwhile, portions of the third winding 23 and the fourth winding 24 also cross with each other outside the passages 31 and 32, except for that the first winding 21 and the second winding 22 cross with each other on the side of the first end face 39a of the passage, while the third winding 23 and the fourth winding 24 cross with each other on the side of the second end face 39b of the passage. By inserting more windings in the passages 31 and 32 of the magnetic core 1, a circuit of more phases can be integrated to increase the power density. It can be understood that this example is equally applicable to an inductor having one passage or more than two passages.

Figure 9:
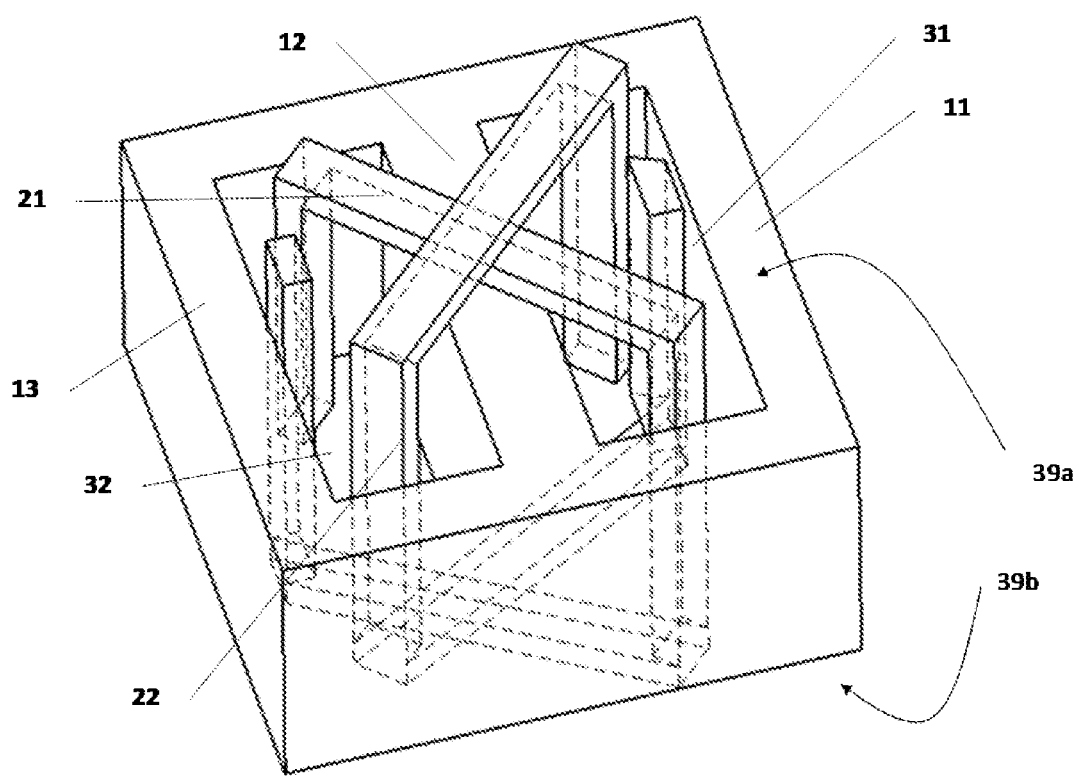
FIG. 9 is a schematic structural view of another inversely coupled inductor according to an embodiment of the present disclosure.
Figure 10:
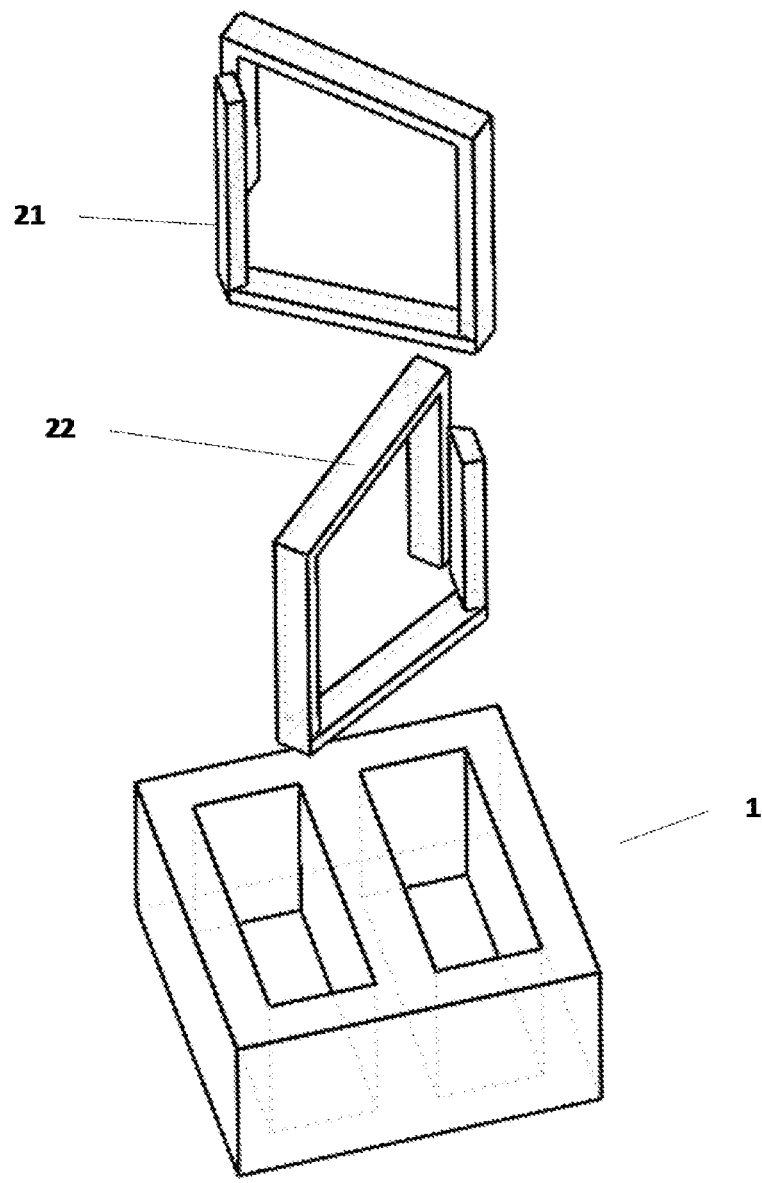
FIG. 10 is an exploded view of FIG. 9.

FIG. 9 is a schematic structural view of another inversely coupled inductor, and FIG. 10 is an exploded view of FIG. 9. As shown in FIGS. 9 and 10, the inversely coupled inductor provided in this example is different from that of FIGS. 3 and 4 in that at least one of the first winding 21 and the second winding 22 is a multi-turn winding wound around the pillar 12 to allow larger inductance or other properties for the inductor. It can be understood that this example does not limit the first winding 21 and the second winding 22 to have multi-turns, nor that the number of turns be equal for the first winding 21 and the second winding 22.

Figure 11:
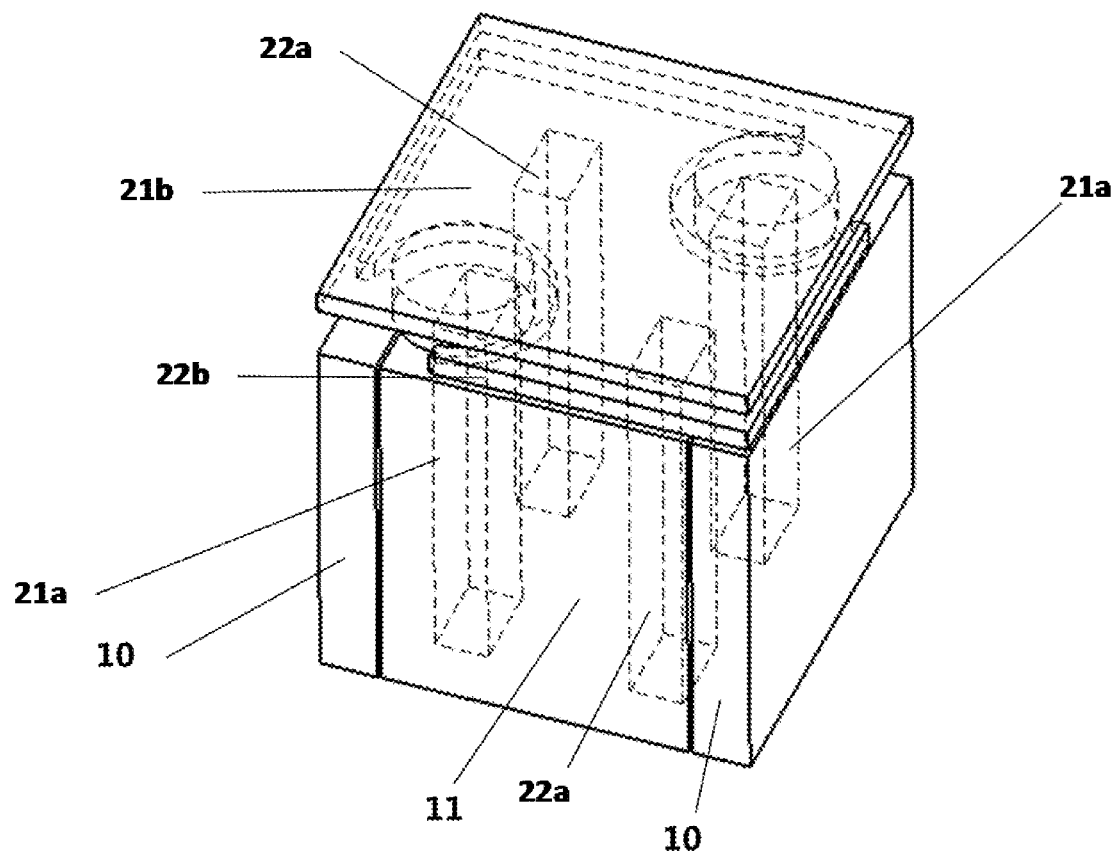
FIG. 11 is a schematic structural view of another inversely coupled inductor according to an embodiment of the present disclosure.
Figure 12:
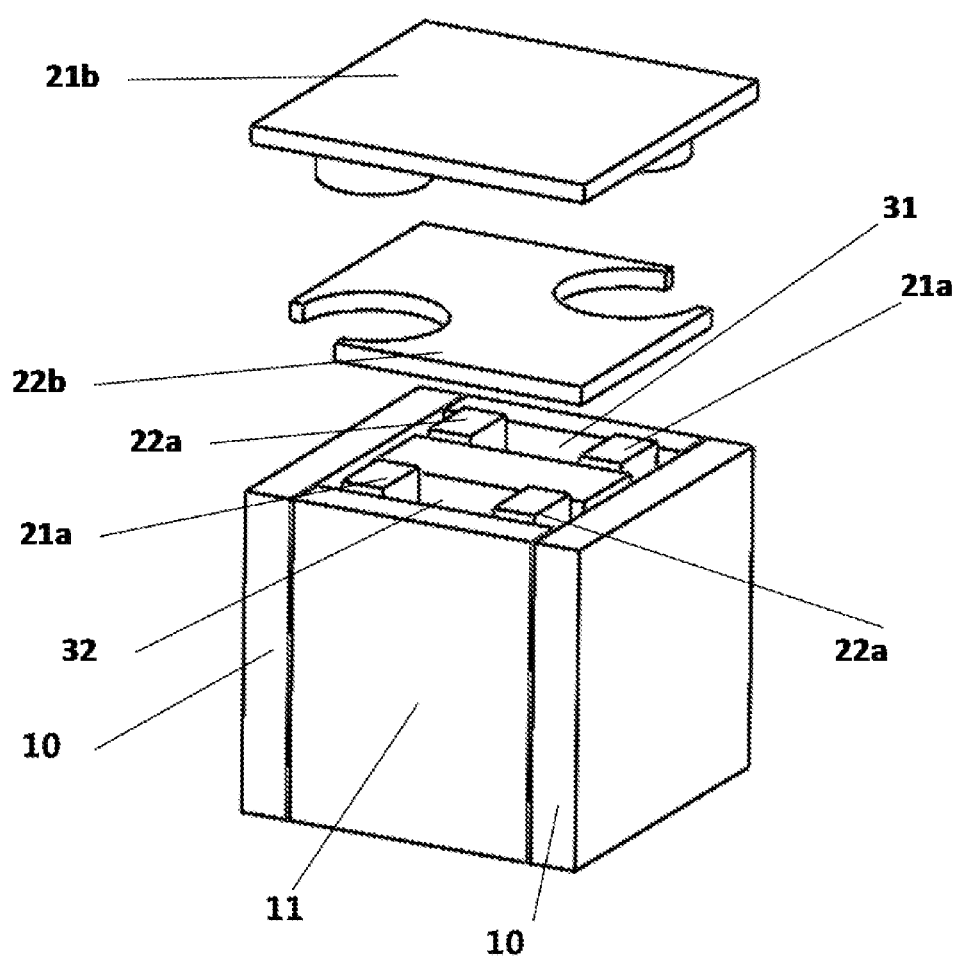
FIG. 12 is a schematic structural view after some of the structures of FIG. 11 are dissembled.

FIG. 11 is a schematic structural view of another inversely coupled inductor, and FIG. 12 is a schematic structural view after some of the structures of FIG. 11 are dissembled. As shown in FIGS. 11 and 12, the inversely coupled inductor of this example differs from that of FIGS. 3 and 4 in that the windings in FIGS. 3 and 4 are unibody structures while those in this example employ the discrete structure as below.

In this example, the portions of the windings 21b and 22b which cross with each other outside the passages 31 and 32 of the magnetic core 1 are separately fabricated from the windings 21a and 22a which penetrate the passages 31 and 32. When the inductor is being assembled, the windings 21a and 21b are electrically connected to complete the first winding 21. Similarly, the windings 22a and 22b are electrically connected to complete the second winding 22.

Specifically, as shown in FIGS. 11 and 12, the windings 21b and 22b are both provided as plate-like structures, and the windings 21b and 22b are arranged in a stacking manner, which are mutually insulated. Two bumps are provided on the winding 21b, while corresponding openings for allow the two bumps to pass through are provided on the winding 22b. When 21b and 22b are stacked at a proper pitch, then 22b and 22a can be made electrically connected, while the winding 21b is electrically connected to the two windings 21a via the two bumps, respectively. Of course, two lower bumps may also be provided at locations on the lower surface of the winding 22b corresponding to the windings 22a for realizing electrical connection with the two windings 22a. Of course, in some examples, the above-described bumps may also be provided on the windings 21a.

Figure 13:
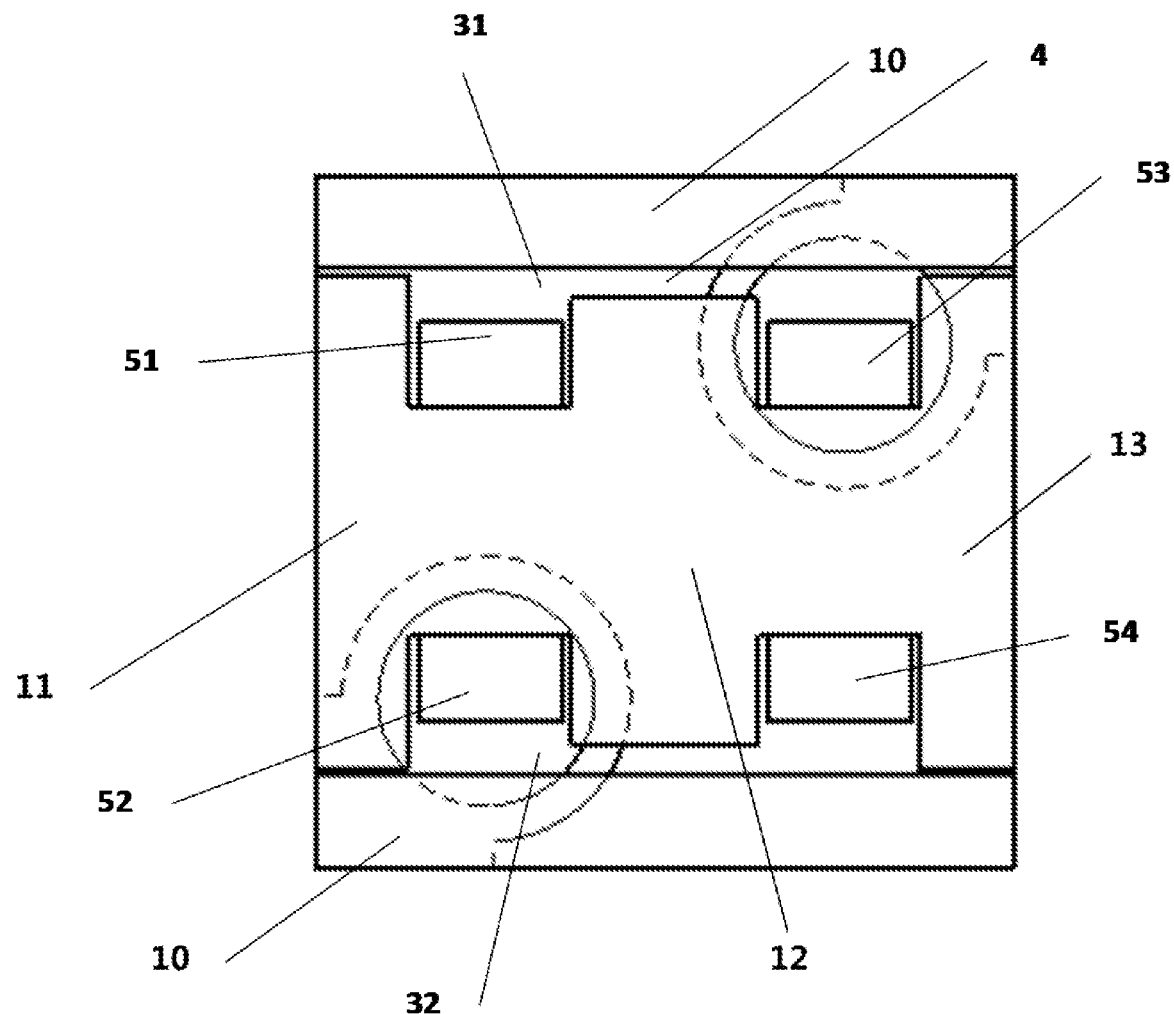
FIG. 13 is a bottom view of another inversely coupled inductor according to an embodiment of the present disclosure.

FIG. 13 is a bottom view of an inversely coupled inductor illustrating the pinout at the bottom. Using FIG. 13 as an example, which is a bottom view of the inversely coupled inductor shown in FIG. 11 and FIG. 12, pins 51 and 52 are same type terminals, and pins 53 and 54 are also same type terminals. Pins 51 and 54 are electrically connected via windings 22a and 22b, and pins 52 and 53 are electrically connected via windings 21a and 21b. A winding 22a electrically connected to the pin 51 and a winding 21a electrically connected to the pin 53 are disposed in the first passage 31, and a winding 21a electrically connected to the pin 52 and a winding 22a electrically connected to the pin 54 are disposed in the second passage 32.

In addition, FIG. 13 also shows that the pillars 11 to 13 disposed between the two side legs 10 in FIGS. 11 and 12 can be replaced with a double-sided "E" shaped magnetic core. Specifically, the magnetic core 1 includes a double-sided "E" shaped magnetic core, and two "I" shaped magnetic cores which are used for connecting both ends of the double-sided "E" shaped magnetic core to form a magnetic loop. As shown in FIG. 13, a passage 31 is assembled and formed on the "E" shaped side in the upper drawing, and a passage 32 is assembled and formed on the "E" shaped side in the lower drawing.

Figure 14:
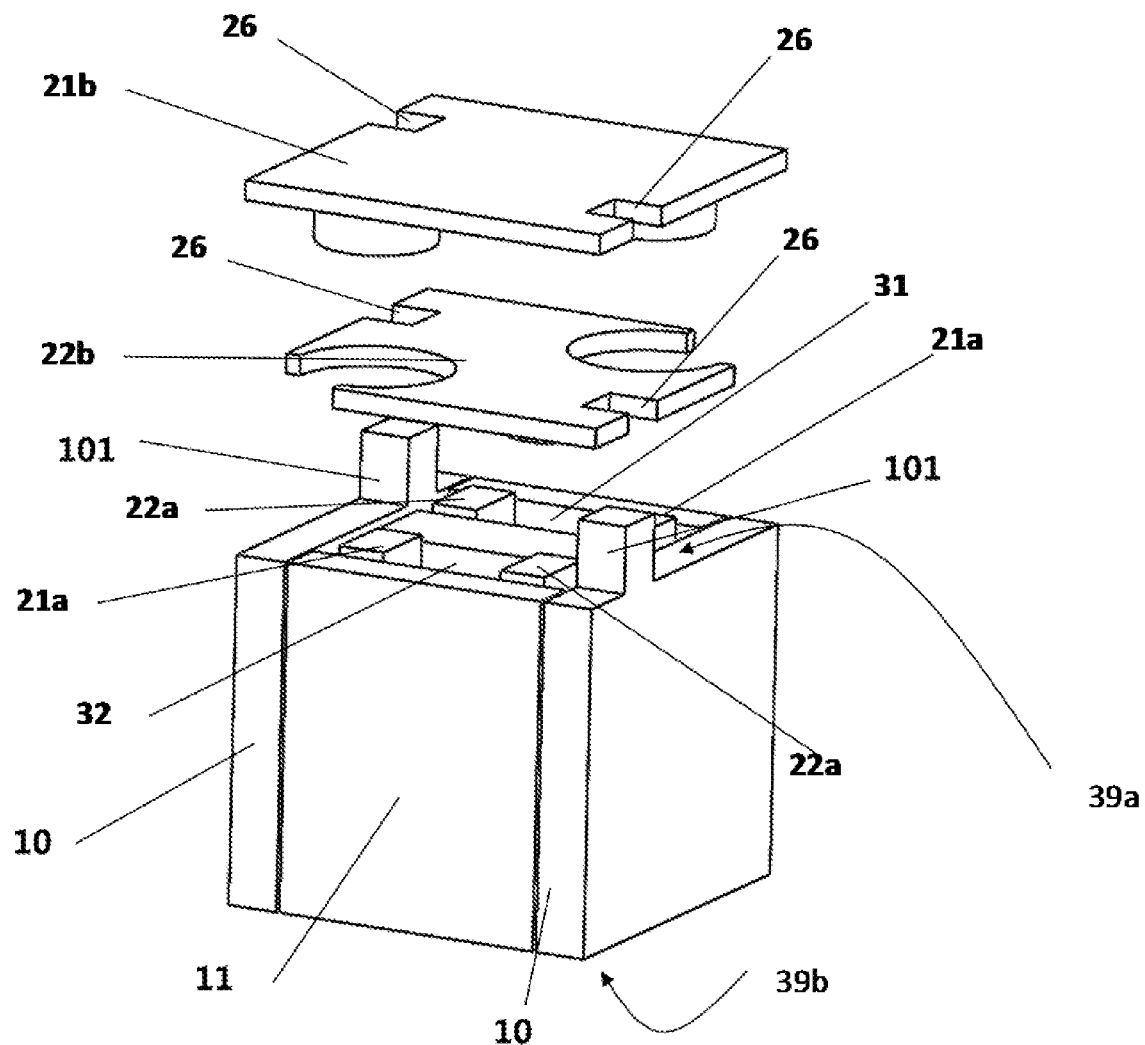
FIG. 14 is a schematic structural view of another inversely coupled inductor according to an embodiment of the present disclosure.

FIG. 14 is the structure of another inversely coupled inductor. It is different from FIG. 12 in that both side legs 10 are provided with magnetic bumps 101 on the side of the first end face 39a of the passage, and the windings 21b and 22b are provided with positioning grooves 26. A matching between the magnetic bump 101 and the positioning groove 26 helps aligning the windings 21b and 22b during assembling. This may, for example, prevent the windings 21b and 22b from displacement or short-circuited to each other. Windings 21a and 22a are provided in the passages 31 and 32. The input and output pins of the inductor are drawn out on the side of the second end face 39b of the passage.

Figure 15:
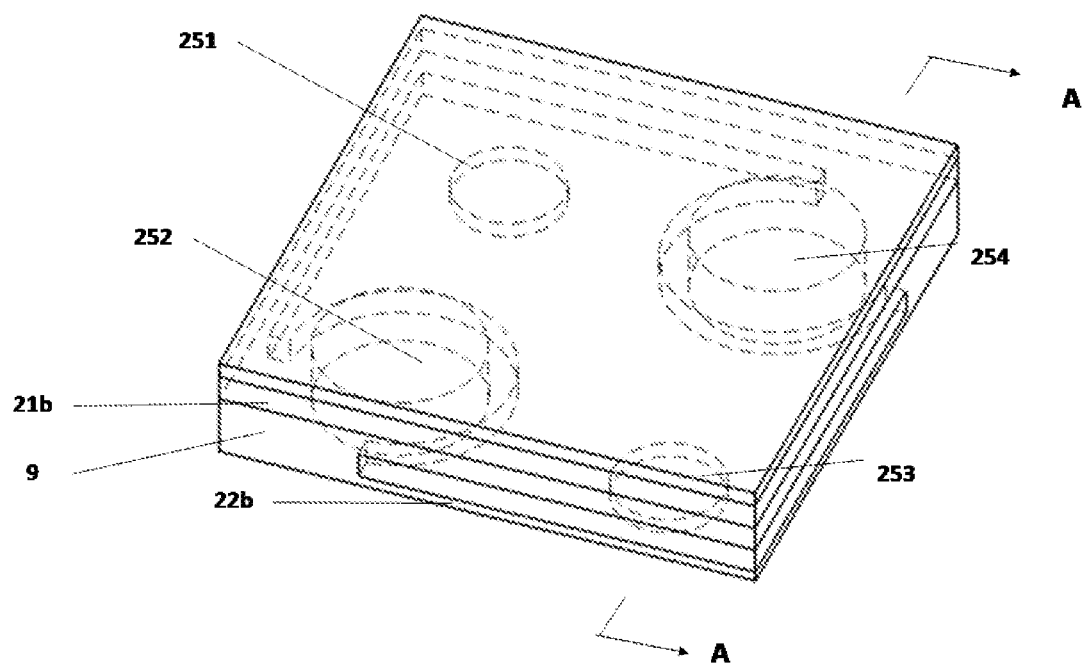
FIG. 15 is a schematic structural view of a winding component according to an embodiment of the present disclosure.
Figure 16:
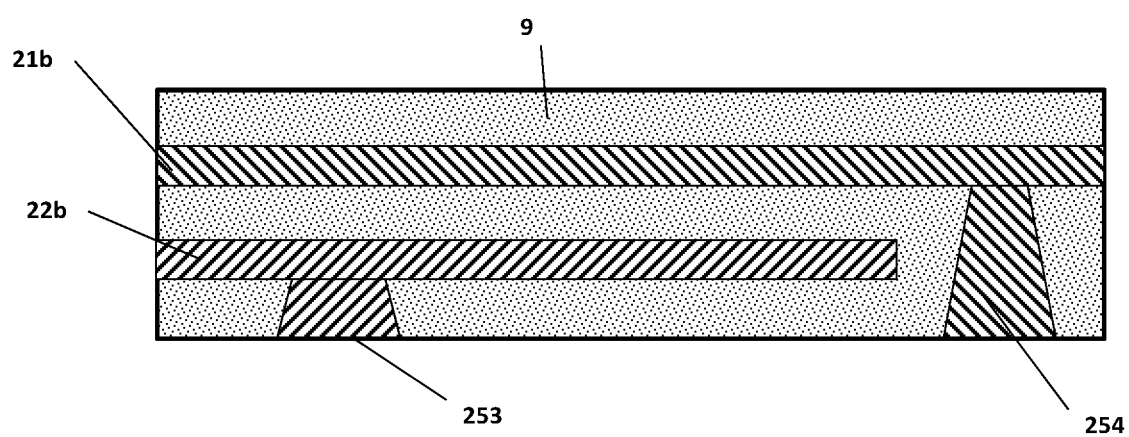
FIG. 16 is a sectional view taken along line A-A of FIG. 15.

FIG. 15 shows an alternative structure for the windings 21b and 22b. FIG. 15 differs from FIGS. 11 and 12 in that the windings 21b and 22b are integrally packaged into a unibody structure. FIG. 16 is a sectional view taken along line A-A of FIG. 15. As shown in FIG. 16, the windings 21b and 22b are both packaged in the insulating encapsulant 9, with the lower surface being provided with pads 251 to 254. The pads 252 and 254 are used to be electrically connected to the winding 21a, and the pads 251 and 253 are used to be electrically connected to the winding 22a. The electrical connection between the pads 25 and their respective winding can be achieved using via plating or other metallizing methods. For example, the pad 253 and the winding 22b in FIG. 16 can be electrically connected using via plating, so can the pad 254 and the winding 21b using via plating. Of course, the electrical connection can also be realized using other metallizing methods.

It should be understood that the winding module shown in FIG. 16 can also be fabricated using a conventional PCB or laminated bus bar process, or using various packaging processes such as a package process using a lead frame for packaging and extracting pads.

Figure 17:
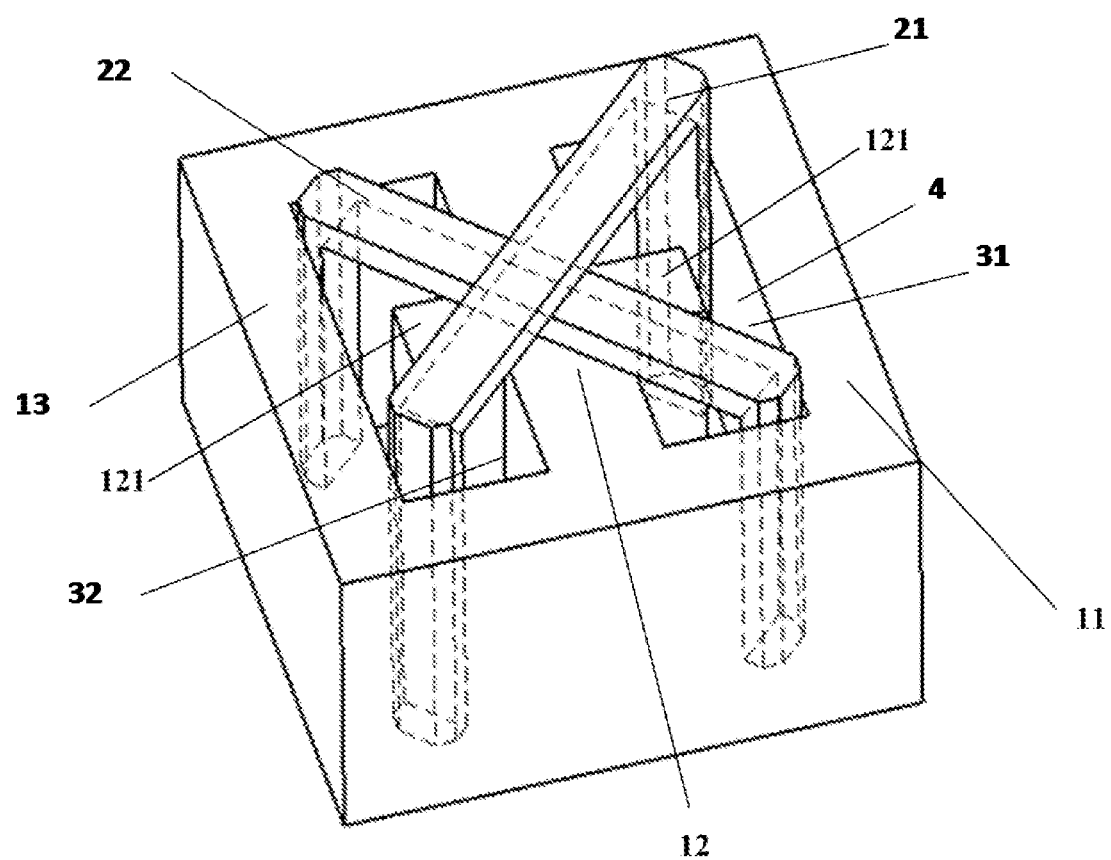
FIG. 17 is a schematic structural view of another inversely coupled inductor according to an embodiment of the present disclosure.
Figure 18:
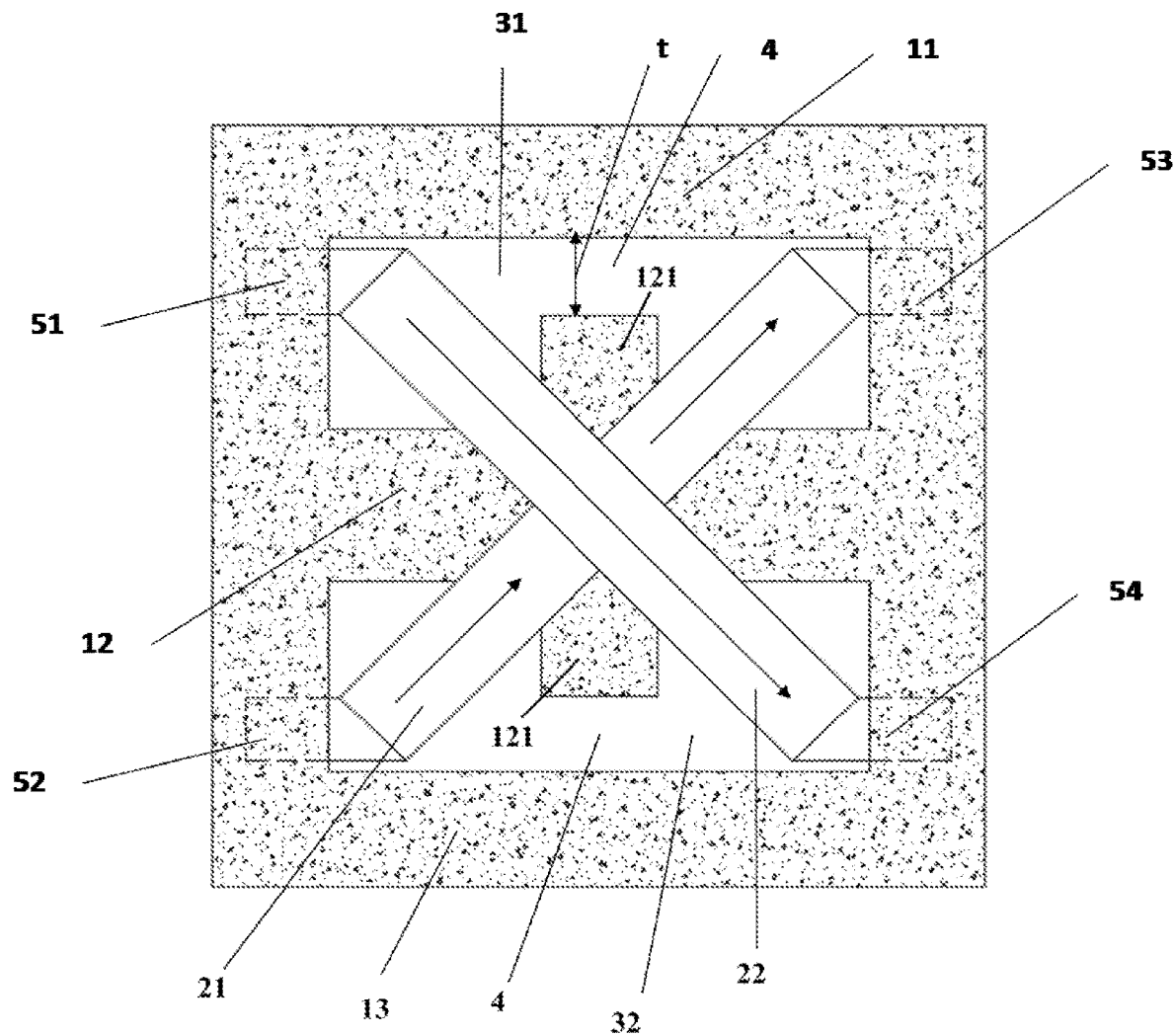
FIG. 18 is a top view of FIG. 17.

Various methods can be used to adjust the coupling coefficient for the inversely coupled inductor of the above embodiment. FIG. 17 is a schematic structural view of an inversely coupled inductor, and FIG. 18 is a top view of FIG. 17. FIGS. 17 and 18 differ from FIGS. 3 and 4 in that a magnetic leg is drawn from the middle of the pillar 12 as a decoupling leg 121 towards the pillars 11 or 13, respectively. The decoupling leg 121 is perpendicular to the pillar 12, and forms an air gap 4 with its opposing pillar 11 or 13. The inverted coupling coefficient can be adjusted by controlling the height t of the air gap 4. Of course, in some examples, one or more decoupling legs 121 may also be formed on one or more of the pillars.

It should be understood that the manner of forming the air gap is not limited to the above. For example, a design in which the air gap 4 is also formed by the double-sided "E" shaped magnetic core is shown in FIG. 13.

Further, in order to adjust the coupling coefficient of the inductor, in addition to the provision of the air gap 4 and further adjustment of the height of the air gap 4, various methods may also be employed, such as adjusting the pitch between the windings or the width of the magnetic leg. That is, the coupling coefficient of the inversely coupled inductor of this example can be adjusted by any one or more of the following methods: providing the air gap 4, adjusting the height t of the air gap 4, adjusting the pitch between the windings 21 and 22 (including but not limited to the pitch between any two of the sections of different windings, such as the first section 211 of the first winding 21, the second section 212 of the first winding 21, the fourth section 221 of the second winding 22, and the fifth section 222 of the second winding 22), adjusting the pitch between two adjacent pillars, or providing magnetic materials with different magnetic properties (e.g., magnetic permeability) between adjacent pillars. Adjusting the inverted coupling coefficient in a variety of ways can improve the flexibility in tuning the inversely coupled inductor, offering a wider range of applications. Moreover, the air gap 4 is within the structure of the inductor, which can reduce the magnetic field leakage, reducing the magnetic interference intensity.

Figure 19:
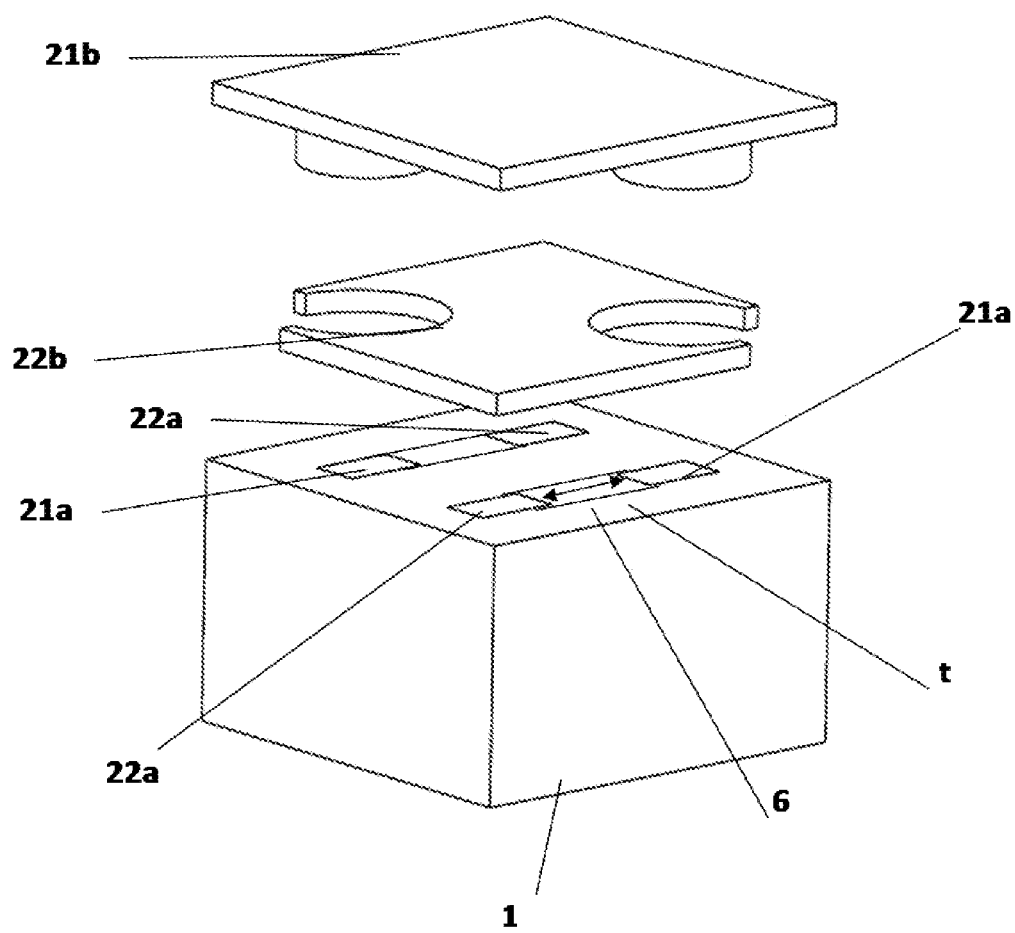
FIG. 19 is a schematic structural view of another inversely coupled inductor according to an embodiment of the present disclosure.

It should be noted that, for a distributed air gap, or an inversely coupled inductor having the structure shown in FIG. 19, an inverted coupling coefficient can be adjusted by altering the space between the portion of the winding 21 and the portion of the winding 22 that are located in the passage 31 or 32 of the magnetic core 1. Referring to FIG. 19, the inversely coupled inductor differs from that of FIG. 12 in that the passages 31 and 32 are packed with packing in a region 6 between the windings, and the cross-sections of the passages 31 and 32 and the cross-section of the first winding 21a or 22a in the passages 31 and 32 are identically shaped. For the inversely coupled inductor of the above structure shown in FIG. 19, the coupling coefficient can be controlled not only by adjusting the space t between the windings, but also by controlling the material properties of the packing in the region 6 between the windings. For example, filling the region 6 with a non-magnetic material can increase the coupling coefficient.

Figure 20:
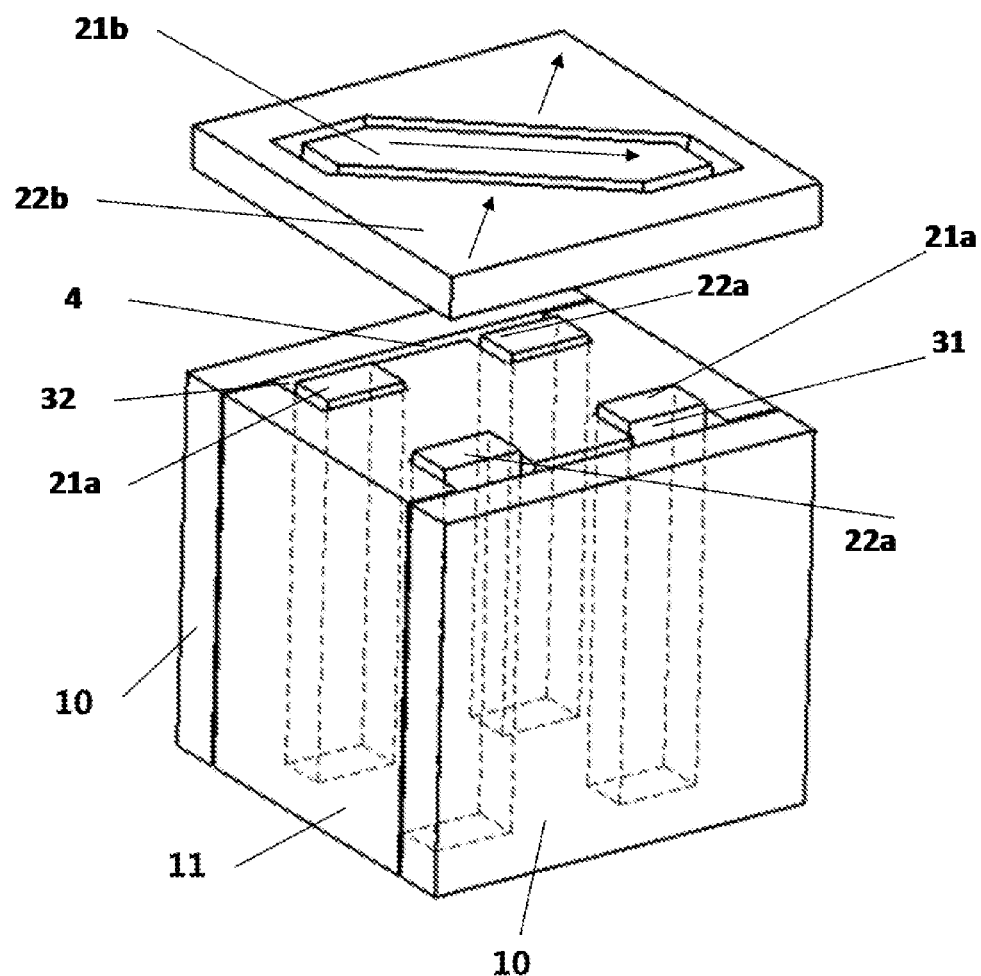
FIG. 20 is a schematic structural view of another inversely coupled inductor according to an embodiment of the present disclosure.

FIG. 20 is a schematic structural view of another inversely coupled inductor. FIG. 20 differs from FIG. 12 in that the windings in FIG. 12 cross with each other by cross-stacking the windings 21 and 22 outside the passages 31 and 32. That is, the windings 21 and 22 cross with each other in FIG. 12 by alternating layers, while FIG. 20 illustrates an implementation in which the windings 21 and 22 cross with each other in the same layer (i.e., cross in the same plane).

Specifically, the windings 21b and 22b are both plate-like structures, and a through hole is formed in the winding 22b, and the winding 21b is embedded in the through hole, so that the windings 21b and 22b are in the same plane, with a gap in between, offering mutual insulation. The winding 22b is electrically connected to the winding 22a in the magnetic core 1, and the winding 21b is electrically connected to the winding 21a in the magnetic core 1. The electric currents flow through the windings 21b and 22b in the directions as indicated by the arrows in FIG. 19, which cross with each other, thus achieving the mutual crossing of the two windings in the same plane. The electric current flow in the winding 21b flows along the arrow, while the electric current flow in the winding 22b flows around the winding 21b, yet generally in a direction that crosses with the direction of the current in the winding 21b.

In addition, FIG. 20 also illustrates that the magnetic core 1 is formed by assembling three segments of magnetic legs having a centralized air gap. The coupling coefficient can be adjusted by controlling the height of the air gap 4.

Figure 21:
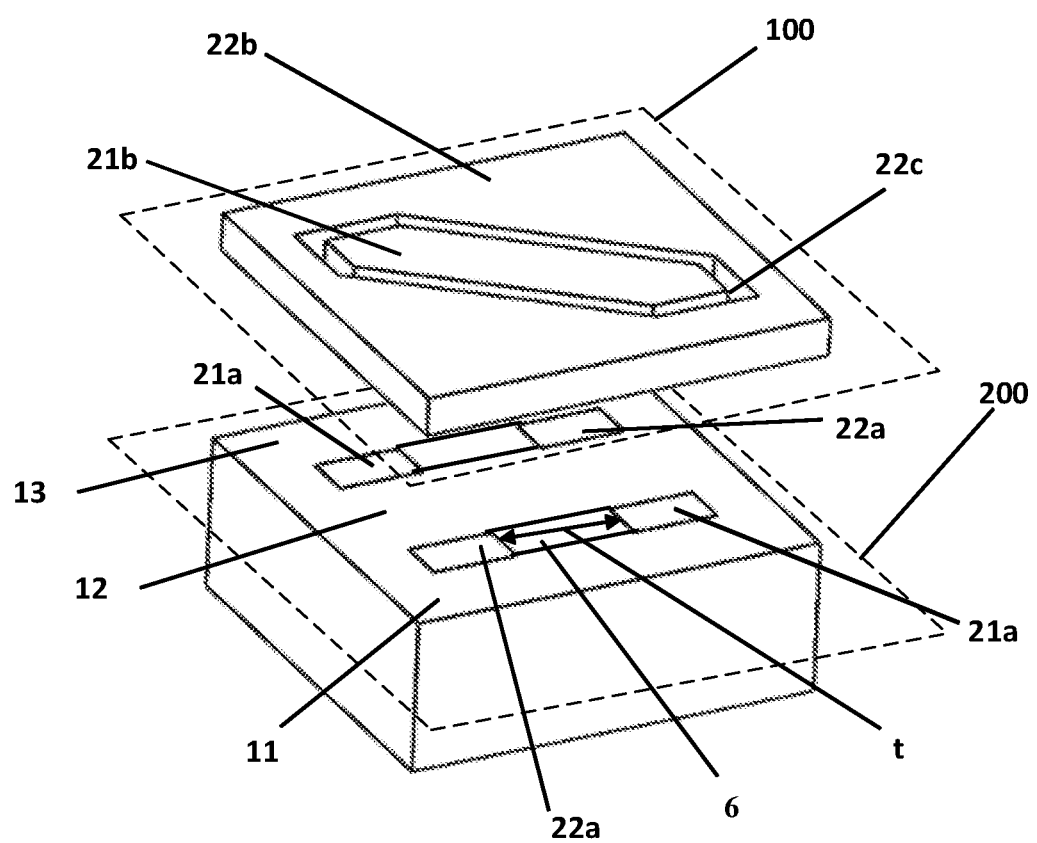
FIG. 21 is a schematic structural view of another inversely coupled inductor according to an embodiment of the present disclosure.

FIG. 21 is a schematic structural view of another inversely coupled inductor. FIG. 21 differs from FIG. 20 in that the windings 21a and 22a are integrally injection molded, having distributed air gaps, and the coupling coefficient can be tuned by controlling the pitch t between the windings or the magnetic properties (e.g., magnetic permeability) of the packing in the region 6 between the windings.

In the inversely coupled inductor as shown in FIGS. 20 and 21, the windings 21b and 22b cross with each other in the same plane, eliminating the stacking of the windings, which is advantageous in reducing the profile of the inductor, while simplifying the fabrication of the windings 21b and 22b and the structure of the inductor.

Figure 22:
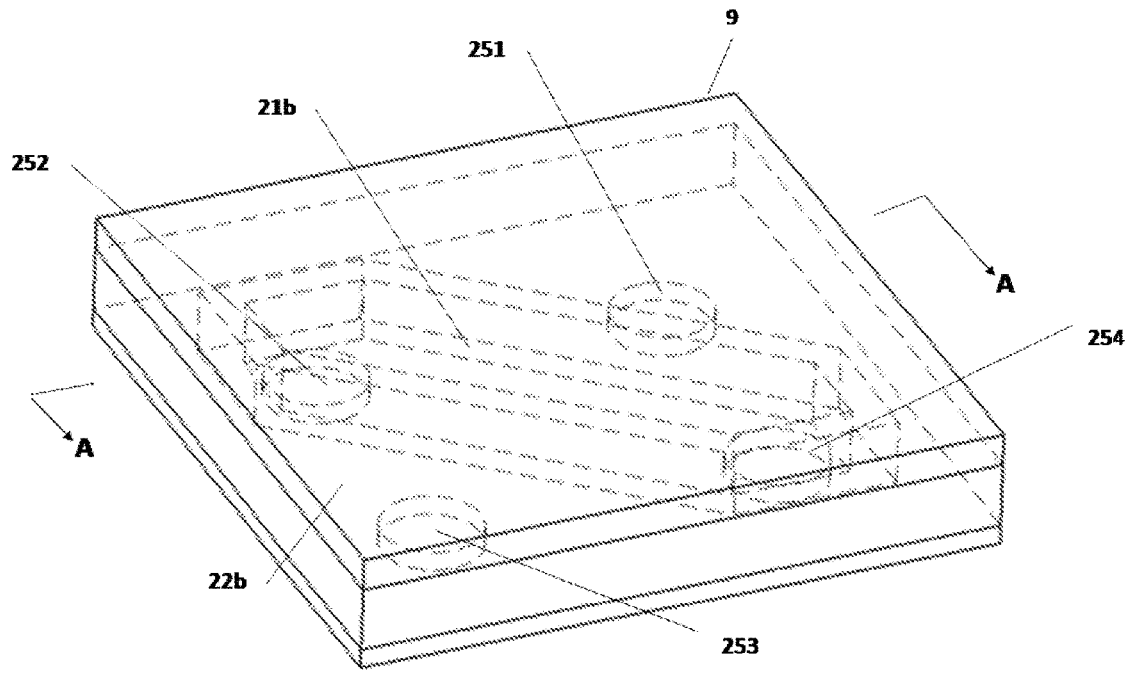
FIG. 22 is a schematic structural view of another winding component according to an embodiment of the present disclosure.

FIG. 22 is an alternative example from the windings 21b and 22b of FIGS. 20 and 21. As shown in FIG. 22, the windings 21b and 22b may be integrally formed, packaged in the insulating material 9, and then be mounted onto the magnetic core 1 below and the windings 21a and 22a as shown in FIGS. 20 and 21 to form a complete inversely coupled inductor.

Figure 23:
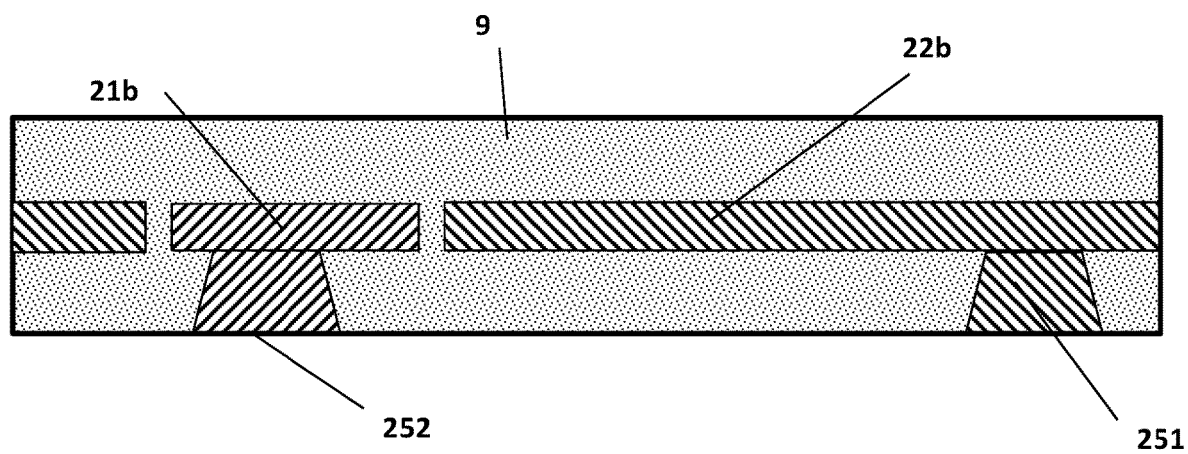
FIG. 23 is a sectional view taken along line A-A of FIG. 22.

FIG. 23 is a sectional view taken along line A-A of FIG. 22. As shown in FIG. 23, the windings 21b and 22b are both packaged in the insulating encapsulant 9, with the lower surface being provided with pads 251 to 254. The pads 252 and 254 are used to be electrically connected to the winding 21a, and the pads 251 and 253 are used to be electrically connected to the winding 22a. The electrical connection between the pads 251 to 254 and their respective windings 21 to 22 can be achieved using via plating or other metallizing methods. For example, the pad 251 and the winding 22b in FIG. 22 can be electrically connected using via plating, and so can the pad 252 and the winding 21b using via plating. Of course, the electrical connection can also be achieved using other metallizing methods.

It should be understood that the winding module shown in FIG. 23 can also be fabricated using a conventional PCB or laminated bus bar process, or using packaging processes such as a package process using a lead frame for packaging and extracting pads.

In this example, the crossed windings 21b and 22b may be integrally formed to improve the modular manufacturing process of the inductor, lower the cost, and improve the reliability of the overall structure, while simplifying the structure and facilitating the assembly process. It is also possible to form other conductive traces in the crossed-windings module. Pads can be formed over the crossed windings, and other elements, such as capacitors or resistors, can be arranged. This offers more flexible application options. The integration and space utilization of the inductor can be further improved.

Figure 24A:
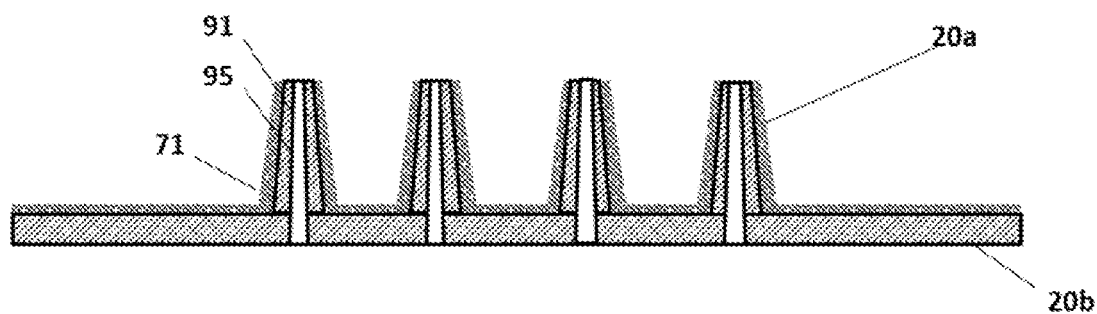
FIGS. 24a to 24d are schematic flowcharts of manufacturing an inversely coupled inductor according to embodiments of the present disclosure.
Figure 24B:
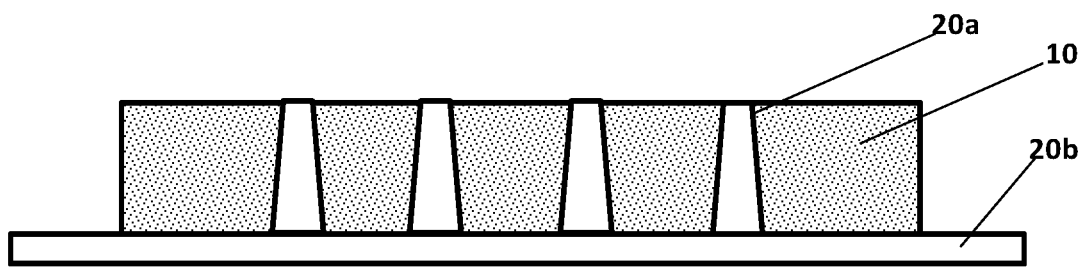

FIGS. 24a through 24d illustrate a method for fabricating an inversely coupled inductor. A conductive structural member is given by a conductive member including an conductive leg 20a (also shown as a pillar 20a) and a connecting piece 20b as shown in FIG. 24a or FIG. 24b. A plurality of conductive legs 20a are provided on a surface perpendicular to 20b, which may be made by, for example, etching on a copper plate, or stamping, or welding or engraving or the like.

Further, it is also illustrated in FIG. 24a that in order to enhance the strength and other characteristics of the conductive legs 20a, a high-conductivity-material 95, such as copper or silver, may be coated on a high-strength material 91, such as steel. Thus, the rigidity and strength of the conductive legs 20a can be greatly improved, and the deformation of the conductive leg 20a can be reduced during the injection molding process. Although the conductivity of the core-reinforced structure 91 will be much worse than that of the high-conductivity-material 95, it should be considered that, in the case of high frequency applications, electric currents flow mostly on the surface of the conductive leg 20a, due to the skin effect. That is, most of the electric currents will be flowing in the highly conductive layer of 91, leaving only a small amount in the core structure 91. Thus, this solution is suitable for the application of high frequency magnetic elements.

Additionally, a layer of other material 71 may be further coated on the outer surface of the conductive leg 20a and the connecting piece 20b before inject molding the upper magnetic material 10 as shown in FIG. 24b. The coated material 71 may be, e.g., a high-voltage-resistant insulating material to raise the voltage rating between the conductive legs 20a, or an etch-resistant material to avoid damaging the internal magnetic material characteristics when the connecting piece 20b is being etched.

Then, as shown in FIG. 24b, the magnetic material is injected into the conductive structural member shown in FIG. 24a using a mold. Since the leg 20a is structurally reliable because it is formed integrally with the connecting piece 20b, the impacts on the leg 20a during the injection molding of the magnetic material, e.g., the magnetic core material, can be controlled and absorbed. Particularly, when the leg 20a is of low height and a cylinder, particularly a conical cylinder, the displacement and deformation between the legs 20a are much smaller.

Figure 24C:
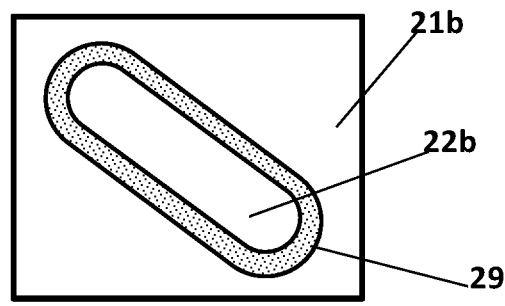

Then, as shown in FIG. 24c, a groove 29 is cut from the connecting plate 20b by etching or engraving, dividing the connecting plate into two partitions to form the cross between the windings outside the passage of the magnetic core.

Figure 24D:
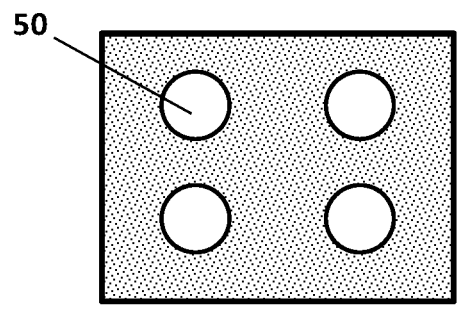

Finally, as shown in FIG. 24d, several pads 50 are formed at the other end of the passage.

It can be understood that cutting can also be performed according to the needs of the process, for example, cutting a molding member of a panel into individual magnetic units; or applying insulation onto the surface after the cutting; or deflashing a conductive portion for some of the portions covered by magnetic material, i.e., removing a portion of the magnetic material to expose the conductive portion, such as the pads 50.

In general, the inversely coupled inductor in the above examples have the following advantages: the crossing portion of the inversely coupled inductor is outside the passage of the magnetic core, which facilitates the mutual insulation treatment of the crossing portion; the two-phase output pins of the inversely coupled inductor are on the same side of the inversely coupled inductor, offering convenience to the customer during practical application, and the improved symmetry of the two-phase circuit is conducive to current equalization; the fabrication of the windings and the magnetic core can happen in parallel, which facilitates modular product design, simplifies the process and reduces the cost. Moreover, since the windings in the passage are connected along the vertical direction to the windings crossing outside the passage, the heat dissipation of the inductor in the vertical direction is facilitated.

FIGS. 25 to 28 are structural views of an inversely coupled inductor in which additional phases are further formed on the basis of the foregoing inversely coupled inductors. For ease of illustration, all descriptions are given using an example of integration of three inversely coupled inductors. Of course, more inversely coupled inductors can still be integrated as needed in practical applications. As shown in FIGS. 25 to 28, the magnetic core includes two side legs 10, and more of pillars 11 to 17, where the first winding and the second winding cross with each other on one of the pillars.

Figure 25:
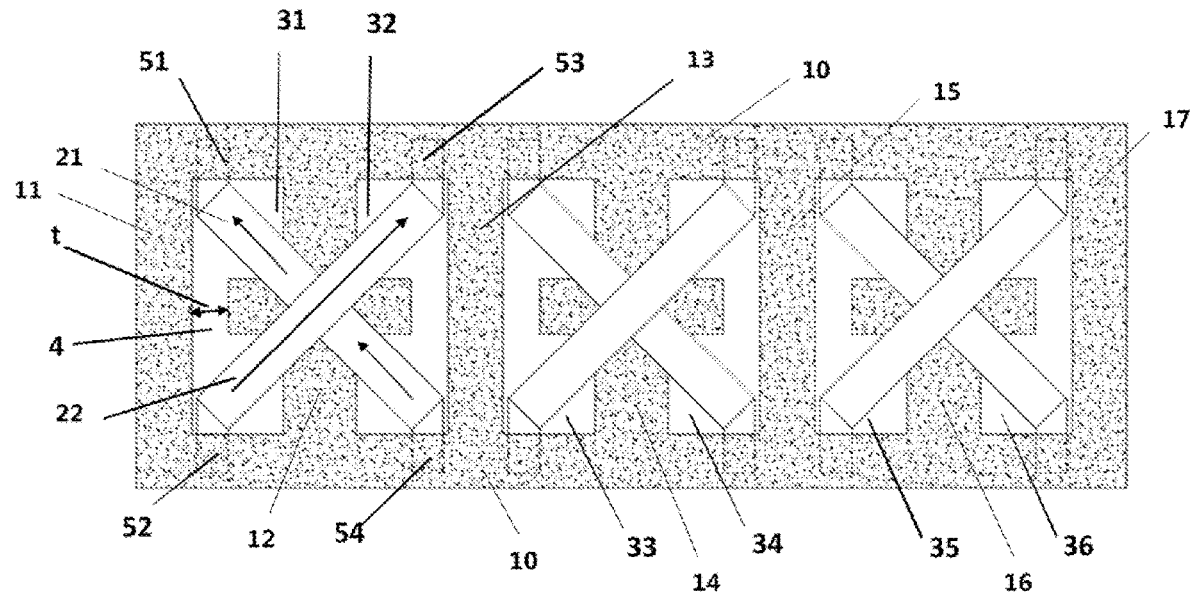
FIGS. 25 to 28 are schematic structural views of a partial multiphase inversely coupled inductor according to embodiments of the present disclosure.

FIG. 25 is a schematic structural view of three inversely coupled inductors integrated in a parallel connection, in which the pillars of two adjacent inversely coupled inductors in tight contact are integrated together to realize magnetic loop multiplexing, thereby improving the utilization of individual magnetic loops in the multi-phase inversely coupled inductors. This can increase the efficiency for an inductor of the same size, or reduce the size for an inductor of the same efficiency. Integration as such can shorten the total length from the left to the right of the multi-phase inversely coupled inductor. For instance, in FIG. 25, the width of two pillars can be reduced. Moreover, the process clearance to be left when the discrete inversely coupled inductor is arranged on the system board can be narrowed, and the size and footprint can be reduced.

Figure 26:
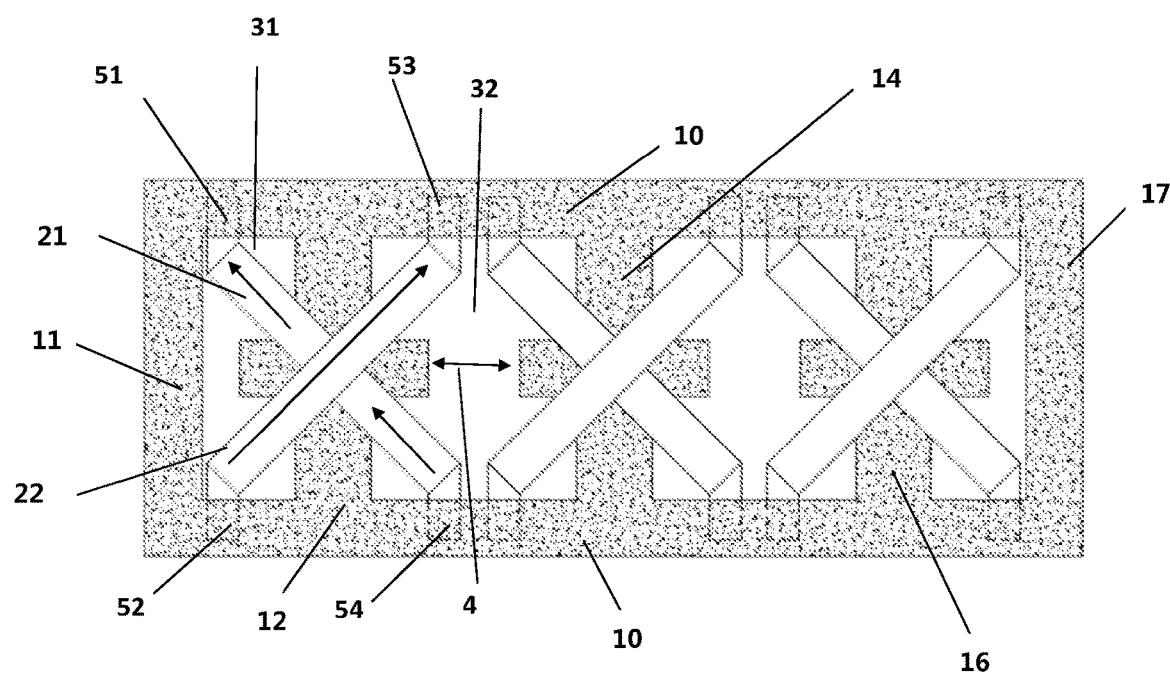

FIG. 26 is an improvement on the basis of FIG. 25, in which the pillar that is adjacent to any two inversely coupled inductors has been canceled, leaving magnetic loop multiplexing to other remaining pillars. Specifically, in FIG. 26, the passages 32 and 33 in FIG. 25 are merged into one passage, and so are the passages 34 and 35 in FIG. 26. The left-to-right dimension of the multi-phase integrated inductor is further reduced, and so is its size.

Figure 27:
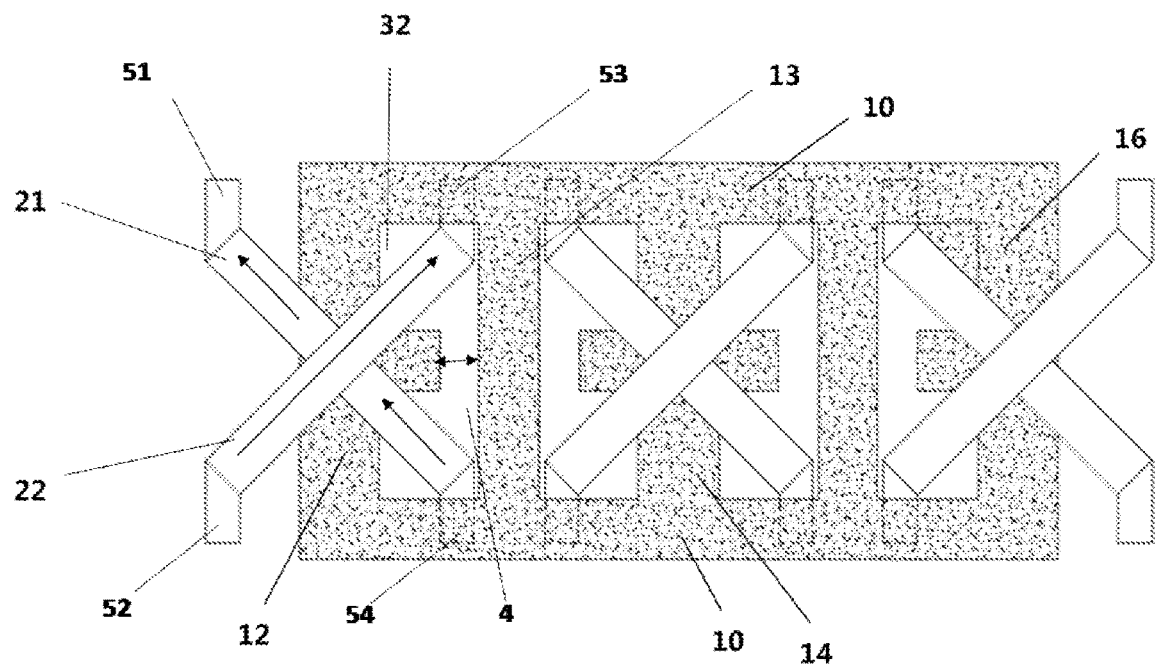

FIG. 27 is an improvement on the basis of FIG. 25, in which the left and right side legs of the multi-phase integrated inductor are cancelled, leaving magnetic loop multiplexing to other remaining pillars to reduce the size and footprint of the inductor.

Figure 28:
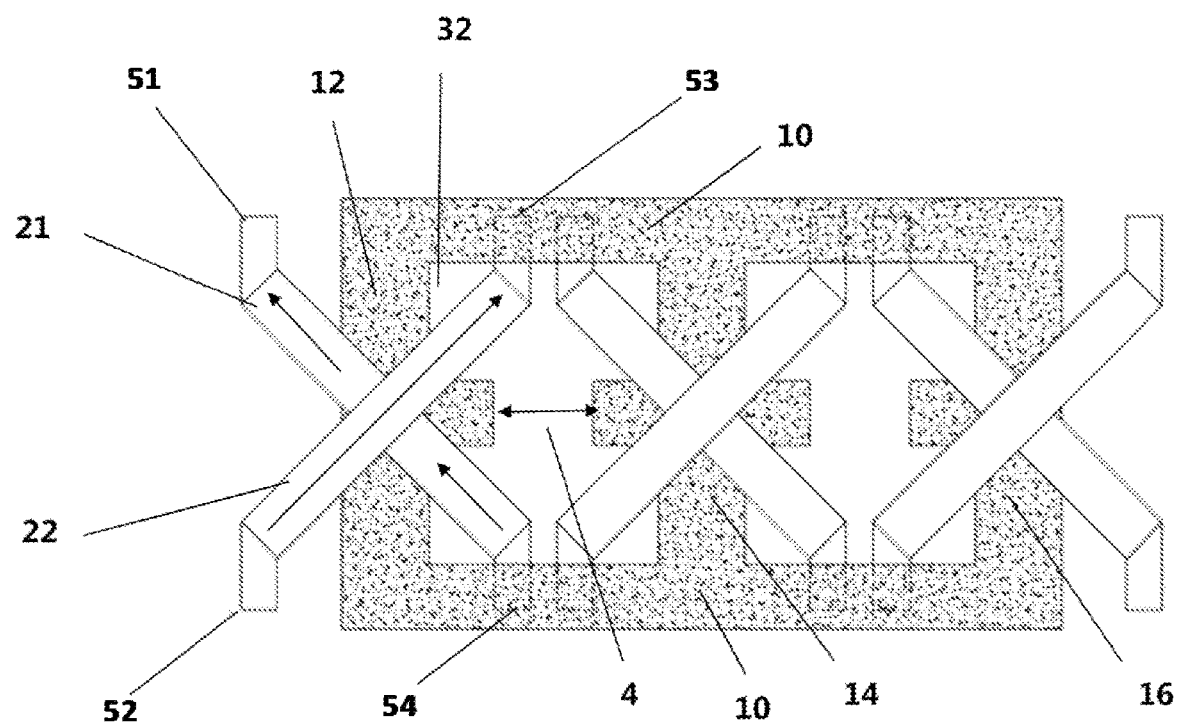

FIG. 28 is an improvement on the basis of FIG. 25, in which all pillars without windings are cancelled, leaving only the pillars 12, 14 and 16 in FIG. 28. Two-phase crossing windings are respectively arranged on the pillars 12, 14 and 16, and a multi-phase inversely coupled inductor is formed by mutual magnetic loop multiplexing, thereby further reducing the size and footprint of the inductor.

Figure 29:
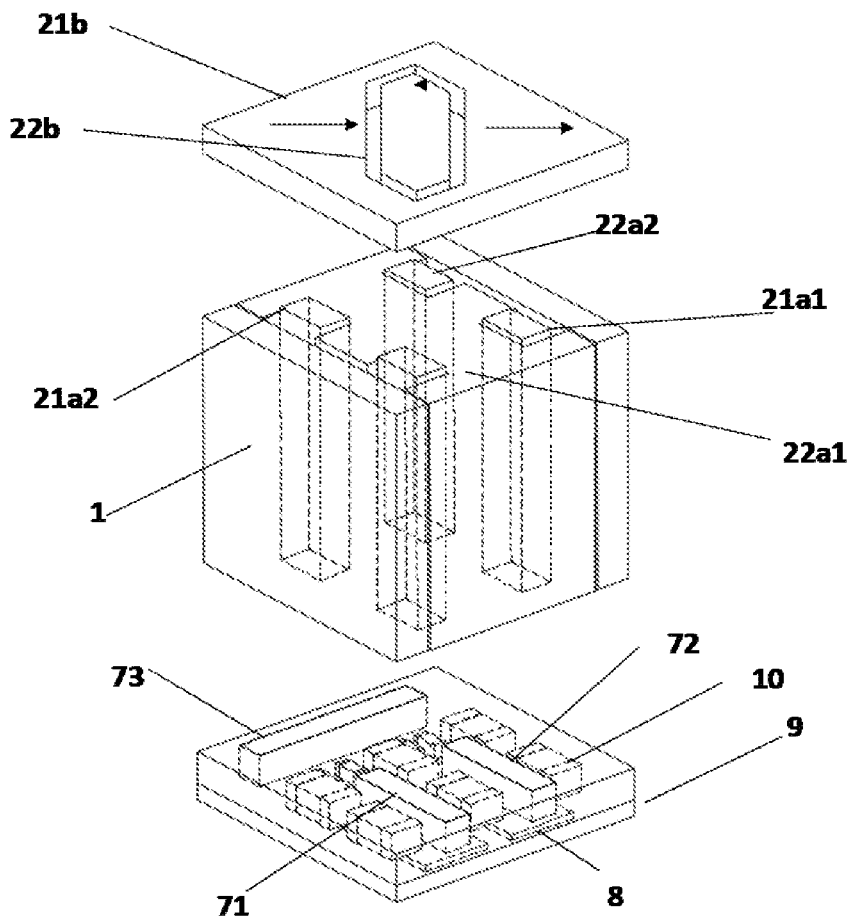
FIG. 29 is a schematic structural view of a power supply module according to an embodiment of the present disclosure.
Figure 30A:
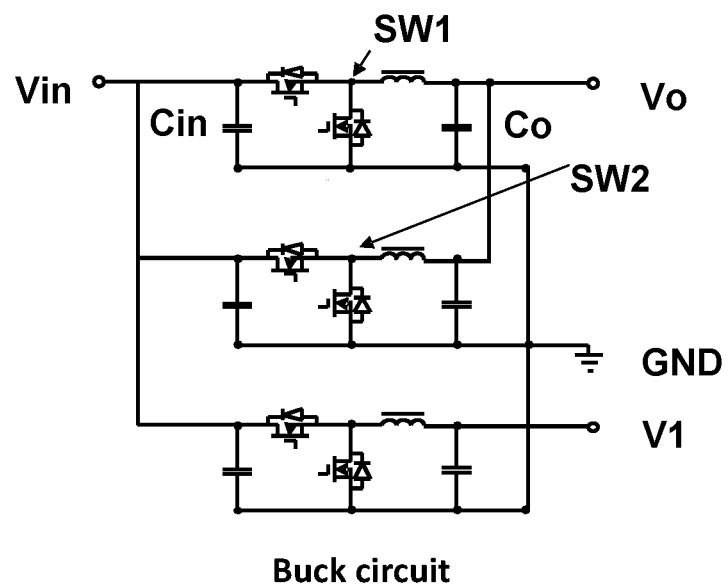
FIGS. 30a to 30c are some of the circuitry views according to embodiments of the present disclosure.

FIG. 29 offers a schematic structural view showing formation of a stacked power supply module based on the inversely coupled inductor proposed in the present disclosure. The two-phase parallel buck circuit shown in FIG. 30a is described. The parallel operation of the two-phase buck circuit is realized by the chip 8 packaged in the insulating packing 1 at the bottom. The two-phase buck main circuit may be implemented by a package of a plurality of chips 8 or a single chip 8. The conductive legs 71 and 72 are electrically connected to the SW1 pin of the first phase of the chip 8 and the SW2 pin of the second phase of the chip 8, respectively. A plurality of input capacitors 10 may also be arranged above or within the package, the pins of which are electrically coupled to the Vin and GND pins in FIG. 30a.

The winding 22a1 in the upper part of FIG. 29 of the inversely coupled inductor is electrically connected to the conductive leg 71, and the winding 21a1 is electrically connected to the conductive leg 72. The winding 22a1 and the winding 22a2 are electrically connected to the winding 22b, and the winding 21a2 and the winding 21a1 are electrically connected to the winding 21b. By arranging the windings 21a and 22b to cross with each outside the passage, the same type terminals of the inductor are on the same side. The windings 21a2 and 22a2 are electrically connected to the conductive leg 73. The conductive member 73 may form a pad (not shown) at the bottom of the package to form an external output terminal for the overall power module.

Of course, the winding 22a1 in FIG. 29 can also be directly and electrically connected to the pad, which in turn is electrically connected to the SW1, on the surface of the package chip module 9, and the winding 21a1 can be directly connected to the pad, which in turn is electrically connected to the SW2, on the surface of the package chip module 9, eliminating the conductive legs 71 and 72. The windings 21a2 and 22a2 can be directly and electrically connected to the pad, which in turn is electrically connected to the output terminals, on the surface of the package insulator 1, eliminating the copper block 73. In this embodiment, a complete power module has been structured on the basis of the foregoing various inversely coupled inductors. The SW terminal penetrates from the upper side of the package of the chip 8, and then upward to be electrically connected with the windings 21a1 and 22a1 of the inductor. Then output current is drawn out from the same side of the module through the crossing of the first windings 22b and 21b, and then through the windings 21a2 and 22a 2. The two-phase output currents of the overall module are drawn out from the same side, which is convenient for customer application, and good for the symmetry of the two-phase circuit. In addition, most of the power current of the overall module flows in the vertical direction, offering short current path, small impedance and desirable heat dissipation towards upwards and downwards. The overall assembly is easy to install, compact in structure and high in power density.

Figure 30B:
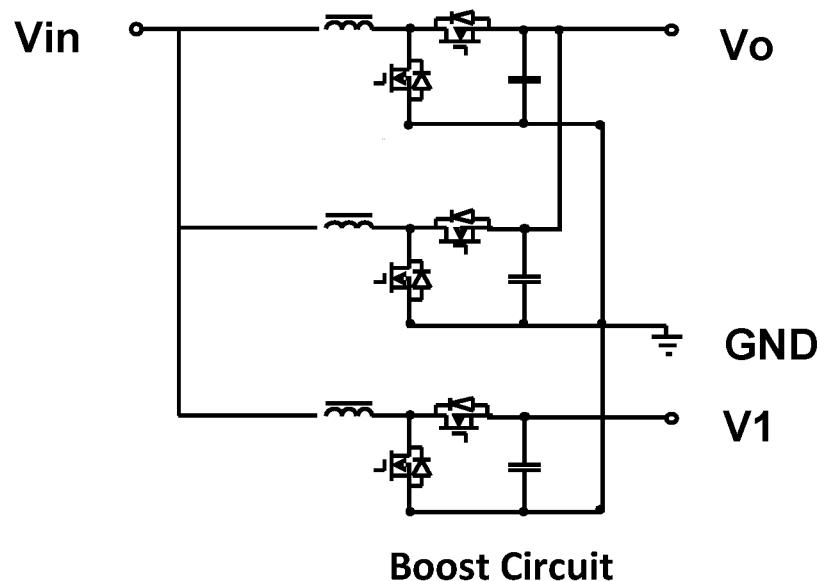
Figure 30C:
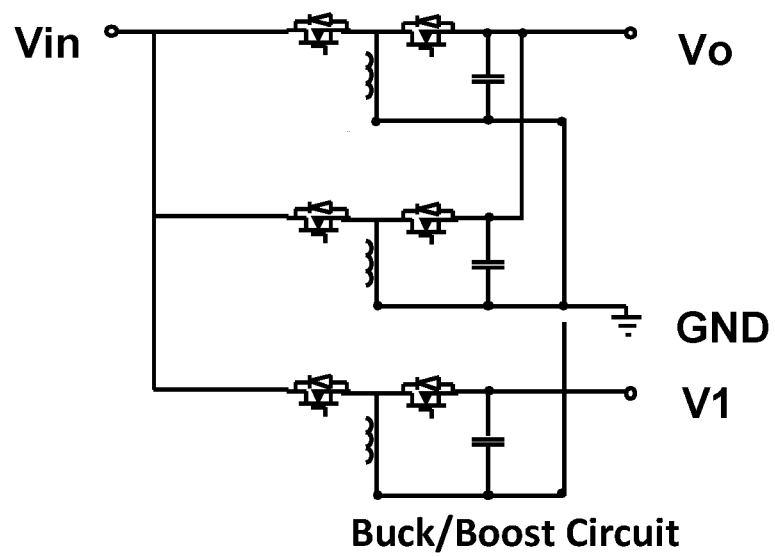

FIGS. 30a to 30c illustrate some of the application circuits of the present disclosure, but the applications are not limited to these circuits. FIG. 30a illustrates a buck circuit in which Cin represents an input capacitor, Co represents an output capacitor, Vin represents the positive input of the half-bridge circuit, GND represents the negative input of the half-bridge circuit, Vo represents the positive output of the half-bridge circuit, SW1 represents the midpoint of the first half-bridge circuit, SW2 represents the midpoint of the second half-bridge circuit, and V1 represents a positive output of the half-bridge circuit having an output voltage different from that of Vo. FIG. 30b illustrates a Boost circuit. FIG. 30c illustrates a Buck/Boost circuit. Although the power supply module has been described above by taking as an illustration the circuit shown in FIG. 30a, which is in multi-phase parallel operation, the inversely coupled inductor of the present disclosure can also be applied in other circuit topologies. For example, other circuits may include, but not limited to, Cuk, flyback, switch capacitor, LLC and the like that may include the reversely coupled inductor. By referring to similar design and analysis, it is possible to achieve similar performance and effect improvements.

Finally, it should be noted that the foregoing embodiments are merely intended for describing, rather than limiting, the technical solutions of the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. An inversely coupled inductor, comprising: a magnetic core, a first winding and a second winding, wherein:
   a first passage is formed in the magnetic core;
   the first winding crosses with the second winding outside the first passage;
   wherein the first winding comprises a first section and a second section, which are oppositely arranged, and a third section, which is positioned between, and electrically connected to, the first section and the second section;
   the second winding comprises a fourth section and a fifth section, which are oppositely arranged, and a sixth section, which is positioned between, and electrically connected to, the fourth section and the fifth section;
   the first section and the fourth section penetrate the first passage; and
   the third section crosses with the sixth section outside the first passage.

2. The inversely coupled inductor according to claim 1, wherein the magnetic core comprises two side legs and two pillars which are oppositely arranged, respectively; and the two pillars are arranged between, and perpendicular to, the two side legs, and the first passage is defined by the side legs and the pillars.

3. The inversely coupled inductor according to claim 1, wherein:
   an electric current flows through the first section of the first winding in a direction opposite to an electric current flowing through the fourth section of the second winding.

4. The inversely coupled inductor according to claim 1, wherein a second passage is further formed in the magnetic core along a first direction, wherein the second passage is located on a right side of, and is parallel with, the first passage;
   the second section and the fifth section penetrate the second passage; and
   the third section crosses with the sixth section outside the first passage and the second passage.

5. The inversely coupled inductor according to claim 4, wherein:
   an electric current flows through the second section of the first winding in a direction opposite to an electric current flowing through the fifth section of the second winding.

6. The inversely coupled inductor according to claim 5, wherein the magnetic core comprises two side legs and at least three pillars, wherein the first passage is a space formed by the two side legs and two adjacent ones of the pillars; and the second passage is a space formed by the two side legs and another two adjacent ones of the pillars.

7. The inversely coupled inductor according to claim 2, wherein a decoupling leg is formed on at least one of the pillars and extends towards another adjacent one of the pillars, the decoupling leg being perpendicular to the pillar while forming, together with the adjacent pillar or a decoupling leg on the adjacent pillar, into an air gap operative to adjust an inversely coupling coefficient.

8. The inversely coupled inductor according to claim 6, wherein a decoupling leg is formed on at least one of the pillars and extends towards another adjacent one of the pillars, the decoupling leg being perpendicular to the pillar while forming, together with the adjacent pillar or a decoupling leg on the adjacent pillar, into an air gap operative to adjust an inversely coupling coefficient.

9. The inversely coupled inductor according to claim 1, wherein the first section, the second section, and the third section are integrally formed into one piece, and/or the fourth section, the fifth section and the sixth section are integrally formed into one piece.

10. The inversely coupled inductor according to claim 1, wherein the third section and the sixth section are plates, and the sixth section is located above the third section;
the sixth section is formed with a first bump electrically connected to the fourth section and a second bump electrically connected to the fifth section, or, the fourth section comprises a first bump and the fifth section comprises a second bump; and
the third section is formed with a first escape groove for the first bump to pass through and a second escape groove for the second bump to pass through.

11. The inversely coupled inductor according to claim 1, wherein the sixth section is a plate, the sixth section is provided with a through hole, the third section is provided in the through hole, a direction of an electric current flowing through the sixth section intersects with a direction of an electric current flowing through the third section.

12. The inversely coupled inductor according to claim 1, wherein the third section and the sixth section are mutually insulated, forming a unibody structure.

13. The inversely coupled inductor according to claim 1, wherein the first section and the second section of the first winding and the fourth section and the fifth section of the second winding are injection-molded with the magnetic core into a unibody structure.

14. The inversely coupled inductor according to claim 13, wherein the inversely coupling coefficient is adjusted by controlling a width of a gap between the first section and the fourth section, or by controlling a width of a gap between the second section and the fifth section.

15. The inversely coupled inductor according to claim 14, wherein a packing for adjusting the inversely coupling coefficient is packed in a region between the first section and the fourth section in the first passage or a region between the second section and the fifth section in the second passage.

16. The inversely coupled inductor according to claim 1, further comprising a plurality of pads for input/output currents, and the plurality of pads are provided on one side of the first passage.

17. The inversely coupled inductor according to claim 2, wherein the magnetic core comprises the two side legs and a plurality of pillars, wherein the plurality of pillars comprises the two pillars; and
the first winding crosses with a second winding on one of the pillars, and on at least one side of the first passage.

18. The inversely coupled inductor according to claim 1, wherein the first passage comprises a first end face and a second end face, which are oppositely arranged; the third section of the first winding and the sixth section of the second winding are provided on the first end face and the second end face, respectively, and a projection of the sixth section of the second winding on the first end face crosses with the third section of the first winding.

19. A power supply module, comprising: a packaged chip module and the inversely coupled inductor according to claim 1, wherein the inversely coupled inductor is stacked on, and electrically connected to, the packaged chip module.

* * * * *